United States Patent
Nagai et al.

(10) Patent No.: US 6,275,977 B1
(45) Date of Patent: Aug. 14, 2001

(54) APPLICATION COOPERATION METHOD AND APPARATUS

(75) Inventors: Yasuhiko Nagai, Tokyo; Yoshiyuki Nakayama, Kawasaki; Kazuma Yumoto, Yokohama; Masato Hayashi, Kawasaki; Toshio Yamane; Shigeaki Kinoshita, both of Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/206,408

(22) Filed: Dec. 7, 1998

(30) Foreign Application Priority Data

Dec. 8, 1997 (JP) .................................................. 9-337208

(51) Int. Cl.$^7$ ........................................................ G06F 9/445
(52) U.S. Cl. ........................................................ 717/1; 717/1
(58) Field of Search .............................. 717/1, 10, 5, 17, 717/2; 709/101

(56) References Cited

U.S. PATENT DOCUMENTS

| | | | |
|---|---|---|---|
| 5,848,143 | 12/1998 | Anrews et al. | 379/219 |
| 5,999,908 | 12/1999 | Abelow | 705/1 |
| 6,049,602 | 4/2000 | Foladare et al. | 379/265 |
| 6,078,326 | 6/2000 | Kilmer et al. | 345/353 |
| 6,088,659 | 7/2000 | Kelley et al. | 702/62 |
| 6,112,181 | 8/2000 | Shear et al. | 705/1 |
| 6,148,067 | 11/2000 | Leipow | 379/201 |
| 6,185,683 | 2/2001 | Ginger et al. | 713/176 |
| 6,199,068 | 3/2001 | Carpenter | 707/100 |

OTHER PUBLICATIONS

Enhancing workflows by web technology; Wolfgang Grather, Wolfgang Prinz and Sabine Kolvenbach; Proceeding on the International ACM SIGGROUP Conference on Supporting Group Work: The Integration Challenge, 1997, pp. 271–280.

Persistant Storage for a Workflow Tool Implemented in Smalltalk; Bob Beck and Steve Hartley; Proceeding of the ninth annaul conference on Object–oriented programming systems, language, and application, 1994, pp. 373–387.

A Web Based Enterprise Workflow System; Charles K. Ames, Scott C. Burleigh and Stephen J. Mitchell; Proceedings of the International ACM SIGGroup conference on Supporting Group Wrk: The Integration Challenge, 1997, pp. 214–220.

Expert Workflow: Building Knowledge–based Workflow Systems with Object Technology; Sven Erik Johansson, Benedikte Harstad Kallak, Thomas Bech Pettersen and Jan Erik Ressem; Addemdum to the 1997 ACM SIGPLAN conference on Object–oriented programming, and app.

*Primary Examiner*—Mark Powell
*Assistant Examiner*—Michael B. Holmes
(74) *Attorney, Agent, or Firm*—Antonelli, Terry, Stout & Kraus, LLP

(57) ABSTRACT

In an application cooperation apparatus for supporting configuration/reconfiguration of a business process support system, node class object information defining a logical AP object as an object class for each common process item and attribute and defining an inheritance relationship between object classes as a tree structure is provided to define interactively with a user a logical process model having logical AP objects as business components. Next, by referring to logical-physical object correspondence relationship information, an implementation process model for the logical process model is developed to generate execution control scripts in a definition language of this model.

16 Claims, 16 Drawing Sheets

APPLICATION COOPERATION METHOD AND APPARATUS

BACKGROUND OF THE INVENTION

The present invention generally relates to a support tool for configuring a system which supports business processes, and specifically to an application cooperation tool for supporting to realize configuration/reconfiguration of a system which supports business processes, through cooperation/integration of newly developed independent business applications in the form suitable for business processes.

More specifically, the invention relates to an application cooperation tool capable of quickly and easily realizing selection of business applications to be used and cooperation/integration of the business applications, for the following cases (1) to (4).

(1) Configuration of a system which supports to realize a virtual call center, an electronic commerce, a virtual project team, a virtual enterprise, and the like, by using networks such as the Internet, an intranet, and a public switching telecommunication network.

(2) Reconfiguration of a support system for business processes changed because of a business environment change.

(3) Configuration of an information system integrating already present information processing system environments such as public switching telecommunication networks and mainframes, with latest information system environments such as computer telephony integration (CTI).

(4) Conversion of a conventional section-independent information system into a section-interlinking information system.

Various system development/configuration support tools are now used in order to support configuration/reconfiguration of a business process support system.

For example, technology for configuration/reconfiguration of a business process support system has been proposed in which a function of realizing each business process is changed into a software component by using object oriented technology, and these software components are combined, cooperated/integrated in accordance with business processes to be configured (refer to Nikkei Computer, April, 1997, pp. 126 to 136 and Nikkei Byte, August 1996, pp. 204 to 221).

Another technology for configuration/reconfiguration of a business process support system has also been proposed in which, for example, a model representing a business process flow called a workflow is defined, and business applications realizing respective process logics are cooperated/integrated in accordance with the definitions (refer to Workgroup Computing Report, Vol. 19, No. 7, 1996, pp. 3 to 19).

The above-described conventional technologies provide only the platform for cooperating a plurality of software components (business applications) constituting a business process support system. Namely, a software component suitable for each process logic constituting a business process to be incorporated is selected from a group of software components formed based upon various information technologies and tools, and each selected software component is related to a corresponding process logic to thereby configure a business process support system. These works are dependent upon abilities of developers.

With the above-described technologies, therefore, knowledge and experiences of configuration/reconfiguration realizing means such as various types of new and old information technologies/application tools are required when a business process support system is to be configured/reconfigured. It is therefore difficult to effectively select a software component suitable for a business process and make the software component be related to a corresponding process logic. A load on system implementation cannot therefore be supported sufficiently.

SUMMARY OF THE INVENTION

The present invention has been made under the above-described circumstances. It is an object of the invention to provide an application cooperation method and apparatus capable of configuration/reconfiguration of a business process support system by automatically selecting necessary business applications from a defined logical process model and cooperating/integrating these business applications, without making developers unnecessary for configuration/reconfiguration realizing means such as various types of new and old information technologies/application tools.

In order to achieve the above object, the invention provides an application cooperation method which comprises the following steps:

a logical process model definition step of providing logical application object (hereinafter called a logical AP object) information including node class object information and defining interactively with a user a logical process model having logical AP objects as business components, the logical AP object information defining the logical AP object for abstractly defining contents of information processing as an object class for each common process item and attribute and defining an inheritance relationship between object classes as a tree structure;

an implementation process model generation step of selecting a physical application object (hereinafter called a physical AP object) corresponding to each logical AP object constituting the logical process model defined by the logical process model definition step, by referring to logical-physical object correspondence information representative of a correspondence relationship between the logical AP object and the physical AP object for defining a business application (hereinafter called a business AP) which is physical execution means for performing information processing in the unit of an object formed through distributed object technologies, and generating an implementation process model of the logical process model through cooperation of selected physical AP objects;

a script generation step of generating execution control scripts in a definition language for the implementation process model generated by the implementation process model generation step; and a process model supply step of supplying a process model represented by the execution control scripts generated by the script generation step to a process broker object provided as a common business object on a distributed object platform ensuring a mutual cooperation between physical AP objects.

According to the present invention, by only defining the logical process model, it becomes possible to automatically generate the implementation process model constituted of business Ap's which are physical execution means for information processing and scripts for executing business AP's in accordance with the implementation process model.

Accordingly, a user or developer can configure/reconfigure a business process support system without thinking of realizing means such as various types of information technologies/application tools.

In this invention, if the physical AP object corresponding to the logical AP object constituting the logical process model defined by the logical process model definition step cannot be selected, the implementation process model generation step may select as an alternative physical AP object a physical AP object corresponding to a logical AP object defined at a superior object class relative to the subject physical AP object in the inheritance relationship in the node class object information or corresponding to a logical AP object defined at a subordinate object class relative to the superior object class.

Accordingly, even if the logical-physical object corresponding information does not contain a physical AP object corresponding to the logical AP object used by the logical process model defined by a user, it is possible to generate the implementation process model of the logical process model.

Also in this invention, the logical AP object information may include, in addition to the node class object information, a plurality of process class object components constituted of a plurality of logical AP objects, as a template component of a logical process.

Also in this invention, the logical AP object information may include, in addition to the node class object information, a plurality of process instance object components formed in the past as a configuration work component of a logical process, the process instance object components constituting the logical process model.

Accordingly, only by modifying the process class object component or process instance object component, a user can form a desired logical process model.

Further, in this invention, a table edit step may be provided for editing the logical-physical object correspondence information interactively with a user.

Still further, in this invention, a physical AP object corresponding to a logical AP object constituting the logical process may be retrieved by using an interface provided by the distributed object platform, instead of using the logical-physical object correspondence information.

DESCRIPTION OF THE PREFERRED EMBODIMENTS

The first embodiment of the invention will be described below.

In the first embodiment, a business process support system is configured through cooperation of a plurality of business AP groups.

Figure 1:
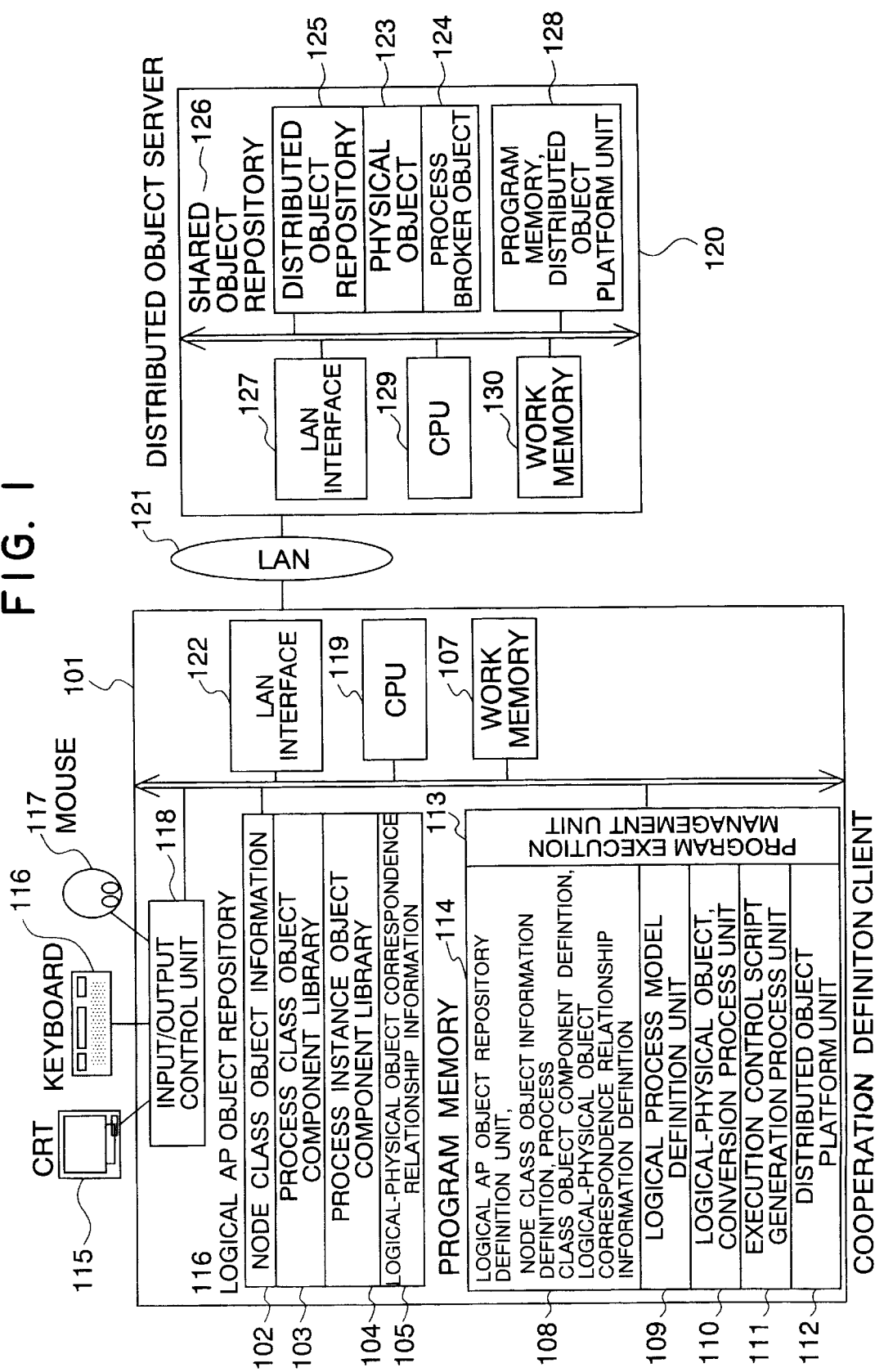
FIG. 1 is a schematic diagram showing the structure of an application cooperation apparatus according to a first embodiment of the invention.

FIG. 1 is a schematic diagram showing the structure of an application cooperation apparatus according to the first embodiment of the invention.

A cooperation definition client 101 is an information processing apparatus for supporting configuration/reconfiguration of a business process support system. The cooperation definition client 101 selects an application for executing each information (business) process constituting a logical process model defined by a user, and defines a cooperation between selected applications. A distributed object server 120 is an information processing apparatus connected via a LAN 121 to the cooperation definition client 101. The distributed object server 120 has an object (process broker object) which sequentially executes applications in accordance with the application cooperation defined by the cooperation definition client 101.

In FIG. 1, although a single information processing apparatus of the distributed object server 120 is shown, a plurality of information processing apparatuses may be used as distributed object servers 120.

First, the structure of the cooperation definition client 101 will be described.

As shown in FIG. 1, the cooperation definition client 101 is constituted of an input/output control unit 118, a LAN interface 122 for interface with LAN 121, a CPU 119, a logical application object repository (hereinafter called a logical AP object repository) 106, a work memory 107 as the working area of CPU 119, and a program memory 114. These components are interconnected by an internal bus. The input/output control unit 118 is an interface with a display device 115 such as a CRT and an input device such as a keyboard 116 and a mouse 117. The program memory 114 stores programs such as a program for defining a logical process model interactively with a user and a program for selecting a business application (hereinafter called a business AP) which executes each information process constituting the defined logical process model and for defining the cooperation between selected business AP's.

The logical AP object repository 106 is constituted of node class object information 102, a process class object component library 103, a process instance object component library 104, and logical-physical object correspondence relationship information 105.

The node class object information 102 is information of logical AP objects defining the contents of information (business) processes which objects are classified into object classes for each common process item (service item), attribute, or event and the inheritance relationship between object classes is defined as a tree structure.

The process class object component library 103 is a library of process class object components (template components of a logical process model) each constituted of plurality of logical AP objects.

The process instance object component library 104 is a library of process instance object components (specific configuration example components of a logical process model) each constituting a logical process model generated in the past.

The logical-physical object correspondence relationship information 105 is a table representative of a correspondence relationship between logical AP objects and physical application objects (hereinafter called physical AP objects) for defining a business AP which is physical execution means for executing an information (business) process converted as an object in accordance with distributed object technologies.

The work memory 107 temporarily stores information retrieved by CPU 119 from the logical AP object repository 106, and stores the logical AP object repository and logical process model or a cooperation definition between business Ap's defined by CPU 119.

The program memory 114 stores therein a logical AP object repository definition program 108, a logical process model definition program 109, a logical→physical object conversion process program 110, an execution control script generation process program 111, a distributed object platform process program 112, and a program execution management program 113.

The logical AP object repository program 108 is a program for supporting to define a logical AP object to be described in the node class object information 102, a process class object component to be described in the process class object component library 103, a process instance object component to the described in the process instance object component library 104, and the logical-physical object correspondence relationship information 104. When this program is executed, a user can enter each definition interactively with the display device 115.

The logical process model definition program 109 is a program for supporting to define the logical process model represented by logical AP objects and representing a business process support system to be configured or reconfigured by a user. When this program is executed, a user can enter the definition of the logical process model interactively with the display device 115.

The logical→physical object conversion process program 110 is a program for selecting physical AP objects corresponding to respective logical AP objects constituting the logical process model defined by the logical process model definition program 109, for cooperating the selected physical AP objects, and for developing (mapping) an implementation process model of the logical process model.

The execution control script generation process program 111 is a program for generating execution control scripts in a definition language for the implementation process model developed at an implementation process model generation step.

The distributed object platform program 112 is a program for providing a distributed object platform which ensures the cooperation between physical AP objects.

The program execution management program 113 is a program for controlling the execution of the above-described programs 108 to 112.

The physical AP object repository 106, program memory 114, and work memory 107 may obviously be constituted of one memory.

Next, the structure of the distributed object server 126 will be described.

As shown in FIG. 1, the distributed object server 126 is constituted of a LAN interface 127 for the interface with LAN 121, a CPU 129, a shared object repository 126, a work memory 130 as the working area of CPU 129, and a program memory 128. These components are interconnected by an internal bus.

The shared object repository 126 is constituted of: a physical AP object 123 for defining a business AP which is physical execution means for executing an information (business) process converted as an object in accordance with distributed object technologies; a distributed repository 125 which is an information file of the physical AP objects 123; and a process broker object for controlling the sequential execution of the physical object group in accordance with the process model represented by execution control scripts.

The work memory 130 stores information retrieved by CPU 129 from the shared object repository 126.

The program memory 128 stores a program for providing the distributed object platform which ensures the cooperation between physical AP objects.

The shaped object repository 126, program memory 128, and work memory 130 may obviously be constituted of one memory.

Next, the operation of the embodiment will be described.

First, a preparatory process for configuration/reconfiguration of a business process support system, i.e., an operation of registering a logical AP object in the node class object information 102, will be described.

Figure 2:
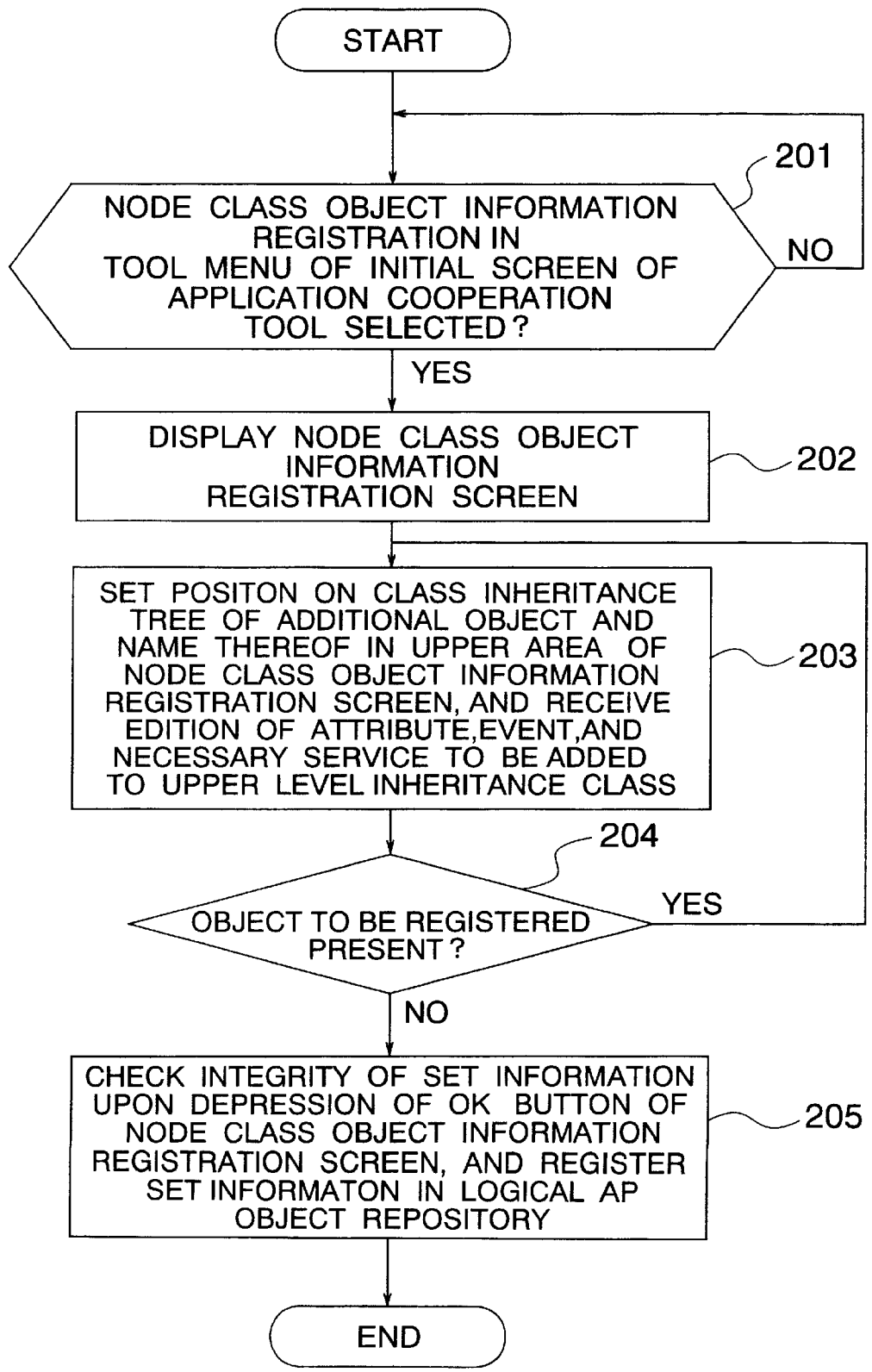
FIG. 2 is a flow chart illustrating an operation of the application cooperation apparatus shown in FIG. 1 when a logical AP object is registered in node class object information 102.

FIG. 2 is a flow chart illustrating an operation of registering a logical AP object in the node class object information 102. The operation of this flow chart starts after the cooperation definition client 101 executes the program execution management program 113 and the initial screen of an application cooperation tool such as shown in FIG. 3 is displayed on the display device 115.

Figure 3:
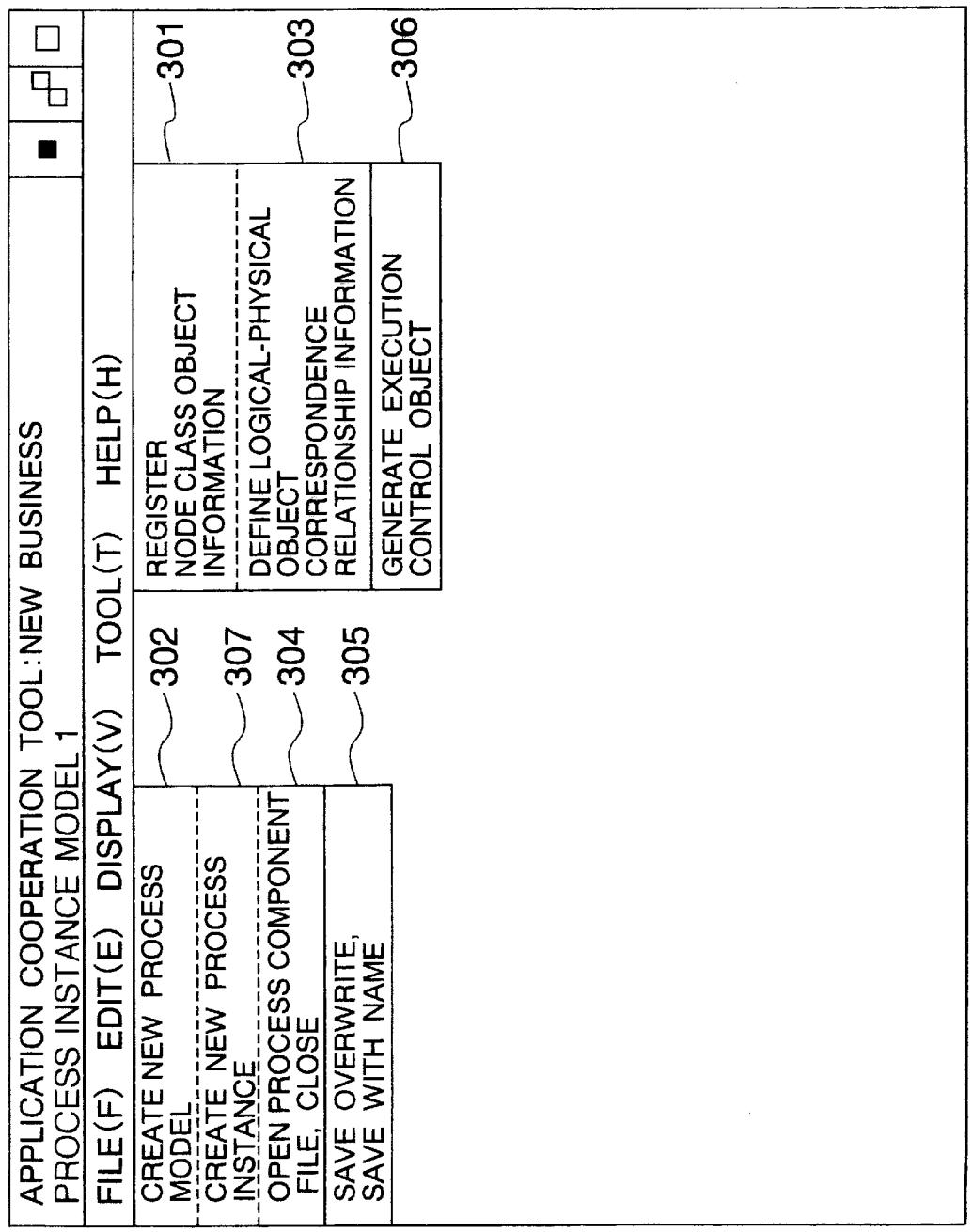
FIG. 3 is a diagram showing an initial screen displayed on the application cooperation apparatus shown in FIG. 1.

First, the program execution management program 113 checks whether or not a user selects with the mouse 117 or keyboard 116 an item "register node class object information 301" in a tool menu of the initial screen shown in FIG. 3 (Step 201).

Figure 4:
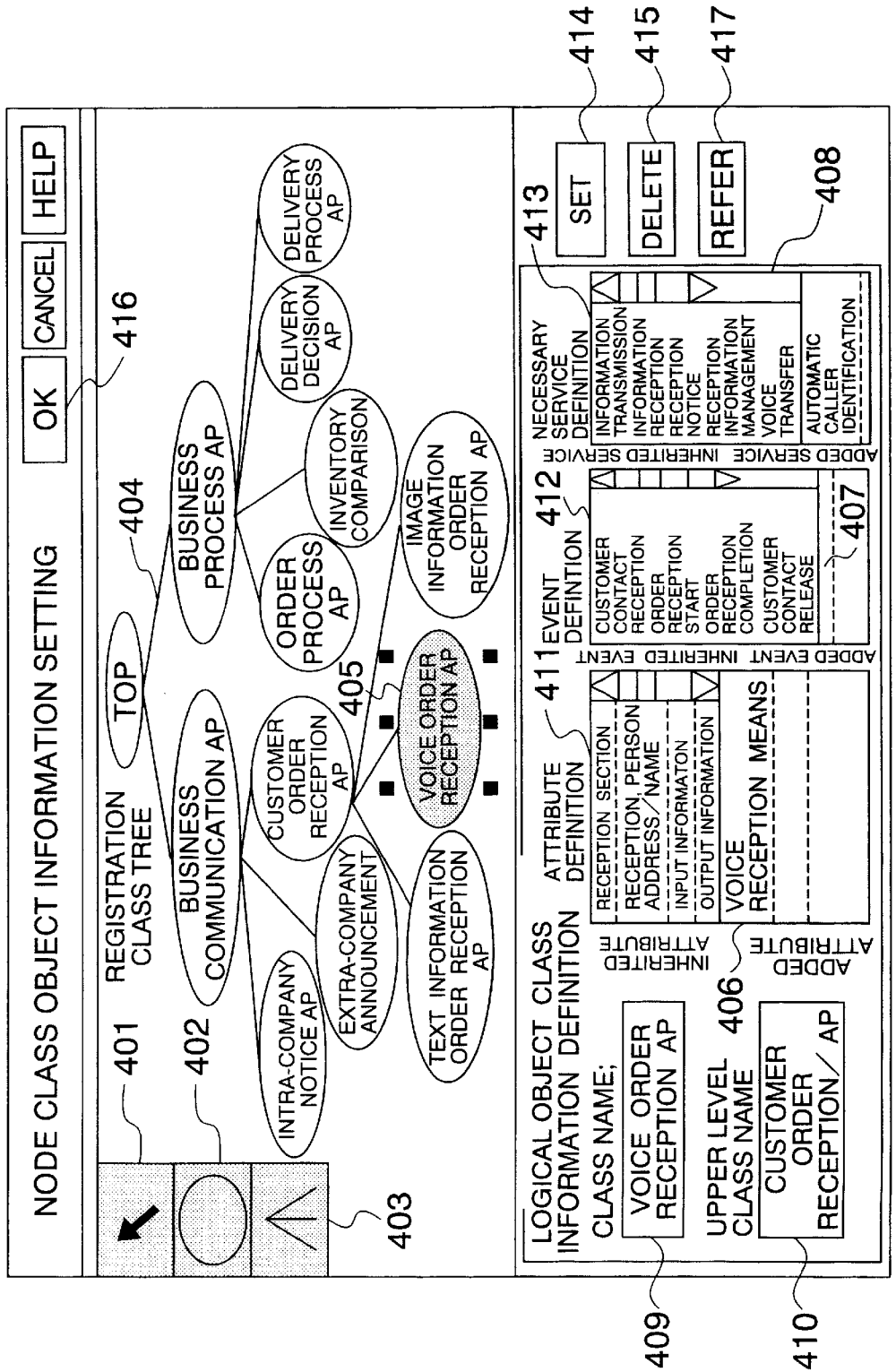
FIG. 4 is a diagram showing a registration screen of node class object information to be displayed during the operation illustrated in the flow chart of FIG. 2.

If selected, the program execution management program 113 activates the logical AP object repository definition program 108. In response to this, the logical AP object repository definition program 108 displays a registration screen of node class object information such as shown in FIG. 4 on the display device 115 (Step 202).

A class inheritance tree 404 is drawn sequentially from TOP to the lower level in an upper area (upper frame) of the registration screen, in accordance with user instructions received in a tool box (including a figure designation pointer 401, a logical AP class definition button 402, and a class inheritance link definition button 403) displayed in the upper area (upper frame) and received in an edit tool displayed in a lower area (lower frame) (Step 203).

The name of a logical AP object (object class) designated by the figure designation pointer 401 is displayed in an edit tool frame 409. The user can edit the name by using the mouse 117 or keyboard 115.

Displayed in edit tool frames 406, 407, and 408 are additionally defined attributes, events, and necessary services of the logical AP object designated with the figure designation pointer 401, which are added to attributes, events, and necessary services of a logical AP object one level higher in the class inheritance tree 404. The user can edit these items by using the mouse 117 or keyboard 115.

It is preferable to define the information on the attribute, event, and necessary service by using the same names of an attribute, event, and necessary service used the definition information of a physical AP object. When a reference button 417 of the edit tool is depressed, the logical AP object repository definition program 108 acquires definition information of the physical AP object from the distributed object repository 125 of the distributed object server 120, by using physical AP object information retrieval service provided by the distributed object platform process program 112, and displays the acquired physical AP object definition information in the form of list. In this manner, the class information definition of each logical AP object is supported to have integrity with the definition information of a corresponding physical AP object.

Displayed in an edit tool frame 410 is the name of a logical AP object one level higher in the class inheritance tree 404 than the logical AP object designated with the figure designation pointer 401.

Displayed in edit tool frames 411, 412, and 413 are attributes, events, and necessary services of a logical AP object one level higher in the class inheritance tree 404 than the logical AP object designated with the figure designation pointer 401, i.e., the attributes, events, and necessary services to be inherited by the logical AP object designated with the figure designation pointer 401.

The name of the object class displayed in the frame 410 and the inherited attributes, events, and necessary services displayed on the frames 411, 412, and 413 are automatically set by collecting the definition information of inheritance classes along the class link. Therefore, it is sufficient for the user to define only the information specific to the logical AP object designated with the figure designation pointer 401.

When a set button 414 (or delete button 415) of the edit tool is depressed, the logical AP object repository definition program 108 completes the information setting (or deletion) of the logical AP object designated with the figure designation pointer 401.

The logical AP object repository definition program 108 repeats the above operations (Step 203) for each object to be registered (Step 204).

Next, the logical AP object repository definition program 108 checks whether or not an OK button 416 in the registration screen is depressed. If depressed, the program 108 checks the integrity (presence of duplicated objects, properness of inheritance relationship, and the like) of the class inheritance tree 404 displayed on the registration screen. If the integrity is satisfied, each piece of information (name, inheritance information, and the like) of the logical AP object displayed on the class inheritance tree 404 is registered in the logical AP object repository 106 as the node class object information 102. If the integrity is not satisfied, a message is displayed to urge the user to select OK/NG relative to incomplete information registration. If NG, the registration screen is maintained displayed, whereas if OK, the registration is executed (Step 205).

Next, a preparatory process for configuration/reconfiguration of a business process support system, i.e., an operation of registering a process class object component in the process class object component library 103, will be described.

Figure 5:
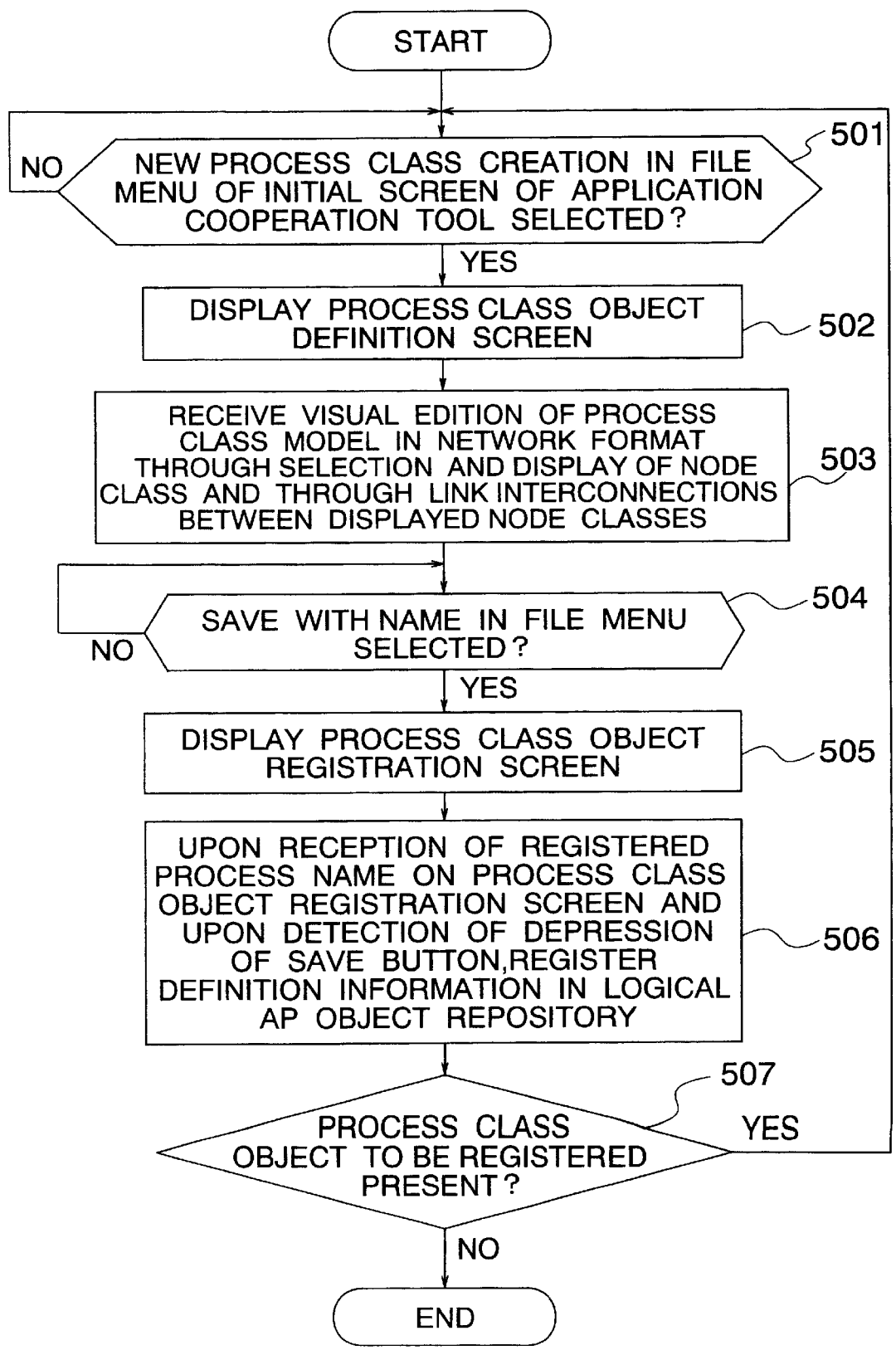
FIG. 5 is a flow chart illustrating an operation of the application cooperation apparatus shown in FIG. 1 when a process class object component is registered in a process class object component library 103.

FIG. 5 is a flow chart illustrating an operation of registering a process class object component in the process class object component library 103. The operation of this flow chart starts after the cooperation definition client 101 executes the program execution management program 113 and the initial screen of an application cooperation tool such as shown in FIG. 3 is displayed on the display device 115.

First, the program execution management program 113 checks whether or not a user selects with the mouse 117 or keyboard 116 an item "form new process class 302" in the tool menu of the initial screen shown in FIG. 3 (Step 501).

Figure 6:
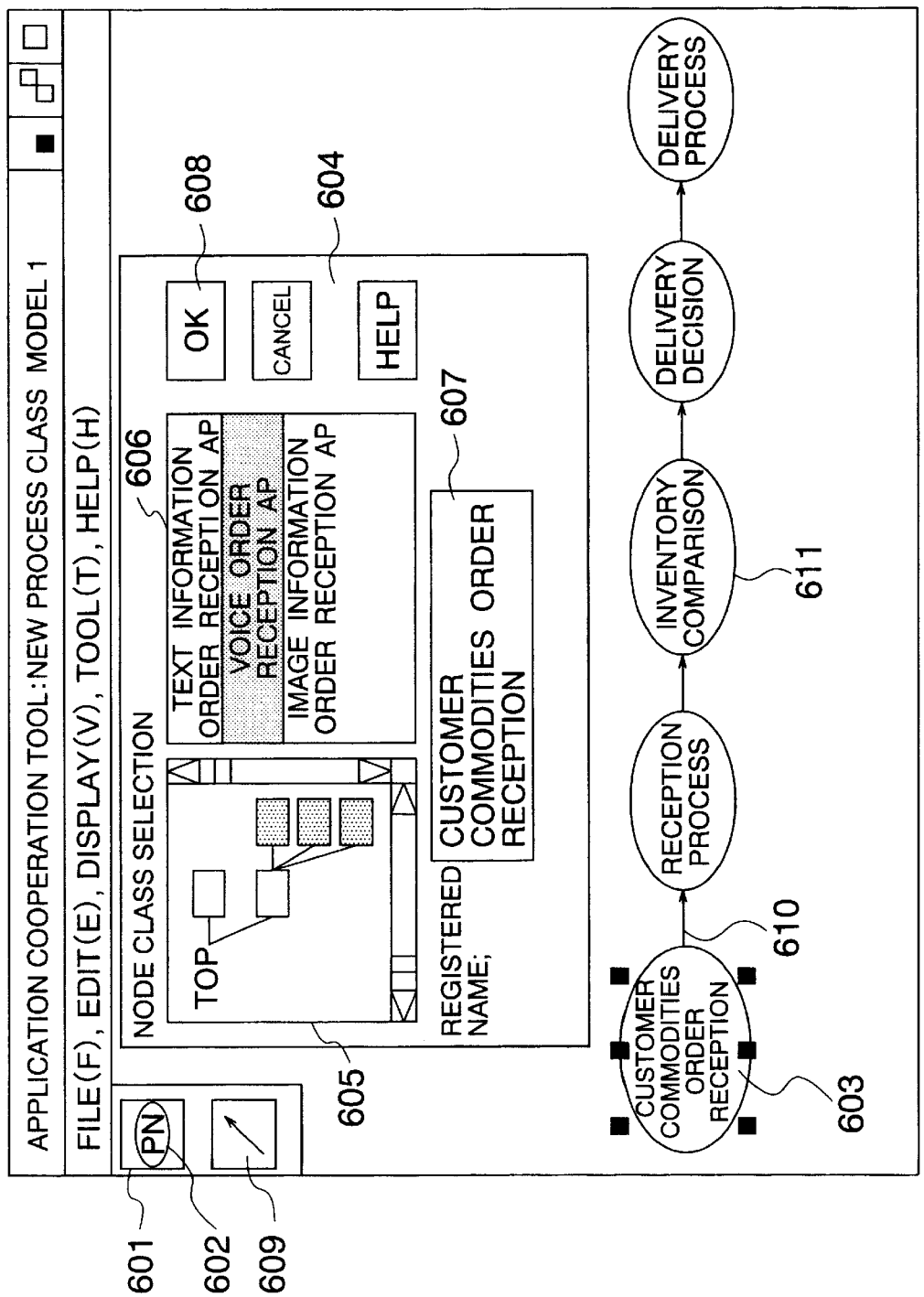
FIG. 6 is a diagram showing a definition screen of process class object information to be displayed during the operation illustrated in the flow chart of FIG. 5.

If selected, the program execution management program 113 activates the logical AP object repository definition program 108. In response to this, the logical AP object repository definition program 108 displays a definition screen of process class object information such as shown in FIG. 6 on the display device 115 (Step 502).

A process class object component 611 is drawn in accordance with user instructions received in a tool box (including a node icon button 602 and a link icon button 609) 601 and in a node class selection dialog screen 604 (Step 503).

In the left area of the node class selection dialog 604, a tree-shaped node class folder diagram 605 is displayed being simplified from the node class object information 102 of the logical AP object repository 106. In the right area, a list of names of folders (object classes) designated by the user with the keyboard 116 or mouse 117 is displayed.

When a node icon 602 of the tool box 601 is depressed, the logical AP object repository definition program 108 displays an ellipsoidal process node 603. Eight marks displayed around the node 603 indicate that a new graphic figure is displayed. These marks are also used in other drawings for the same purpose. One of the folders in the node class folder diagram 605 or in the list of folders is selected and the name entered from the keyboard 116 is displayed in a frame 607. In this state, when an OK button 608 is depressed, the logical AP object identified by the selected object class is made to have a correspondence with the process node 603 displayed on the screen, and the name displayed in the frame 607 is set as the name of the selected process node 603.

The link icon 609 of the tool box 601 is used for displaying interconnections indicating a process flow between a plurality of process nodes 611 displayed on the screen by using the node icon 602. By using the node icon 602 and node class selection dialog 605, the user defines a plurality of process nodes 611 displayed on the screen, and by using the link icon 609, interconnections between the process nodes 611 are formed. In this manner, a process class model (process class object components) of a network configuration can be formed.

Figure 7:
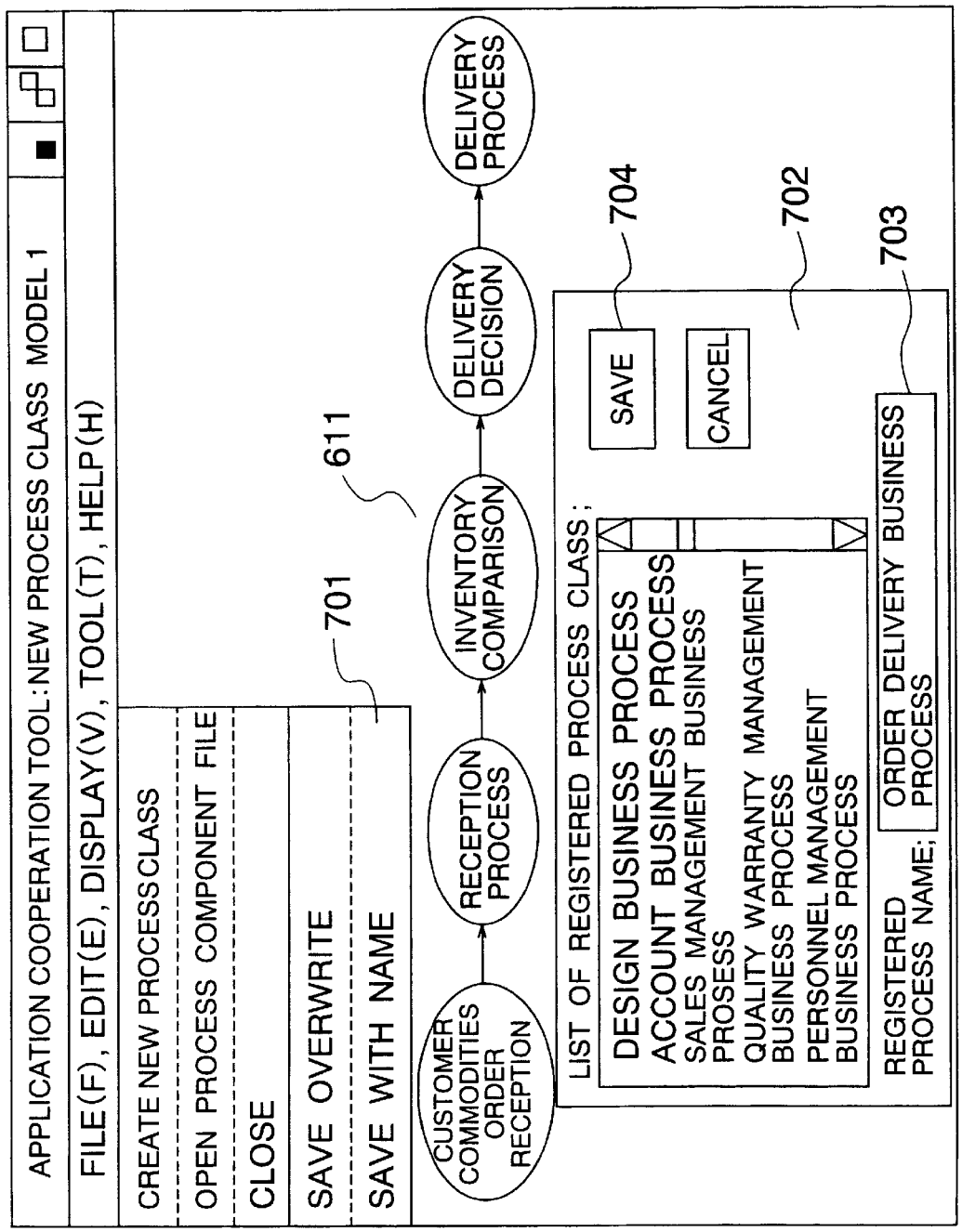
FIG. 7 is a diagram showing a registration screen of process class object information to be displayed during the operation illustrated in the flow chart of FIG. 5.

Next, as shown in FIG. 7, the logical AP object repository definition program 108 checks whether or not the user selects with the mouse 117 or keyboard 116 an item "save with a name 701" in a file menu of the screen (Step 504). If selected, the tool box 601 and node class selection dialog screen 604 are closed and a process class object registration dialog screen 702 such as shown in FIG. 7 is displayed (Step 505).

The process class object registration dialog screen 702 displays a list of process class object components already registered in the process class object component library 103 of the logical AP object repository 106. This information of the list is used as the reference information when the user determines the name of a generated process class object component.

The name entered by the user from the keyboard 116 is displayed in a frame 703.

Next, when a save button 704 is depressed while the name entered from the keyboard 116 is displayed in the frame 703, the logical AP object repository definition program 108 registers the generated process class object component with the name displayed in the frame 703 in the process class object component library 103 (Step 506).

The logical AP object repository definition program 108 repeats the above operations (Steps 501 to 506) for each process class object component to be registered (Step 507).

Next, a preparatory process for configuration/reconfiguration of a business process support system, i.e., an operation of registering logical-physical object correspondence relationship information 105 in the logical AP object repository 106, will be described.

Figure 8:
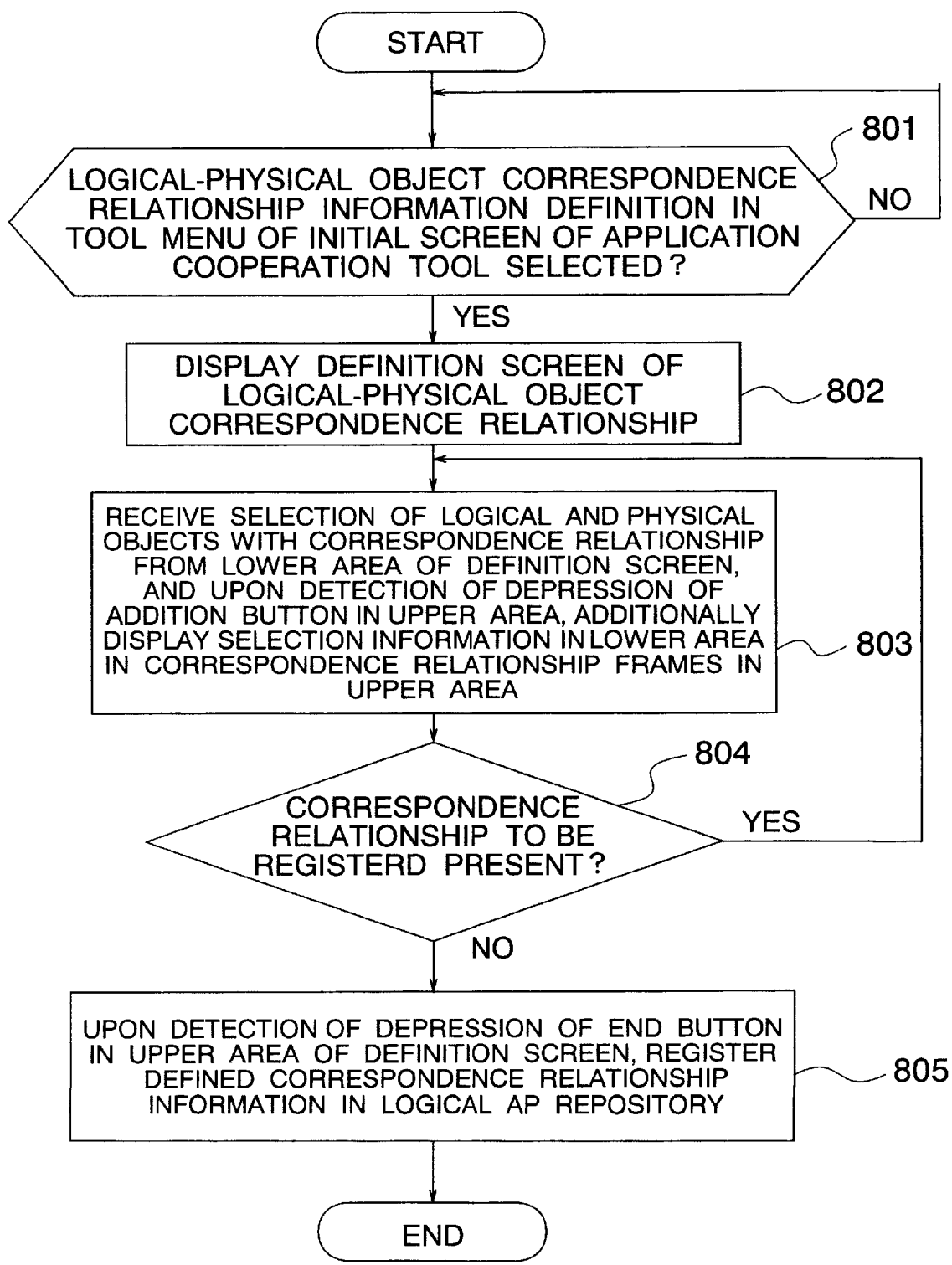
FIG. 8 is a flow chart illustrating an operation of the application cooperation apparatus shown in FIG. 1 when logical-physical object correspondence relationship information 105 is registered in a logical AP object repository 106.

FIG. 8 is a flow chart illustrating an operation of registering logical-physical object correspondence relationship information 105 in the logical AP object repository 106. The operation of this flow chart starts after the cooperation definition client 101 executes the program execution management program 113 and the initial screen of an application cooperation tool such as shown in FIG. 3 is displayed on the display device 115.

First, the program execution management program 113 checks whether or not a user selects with the mouse 117 or keyboard 116 an item "define logical-physical object correspondence relationship information 303" in the tool menu of the initial screen shown in FIG. 3 (Step 801).

Figure 9:
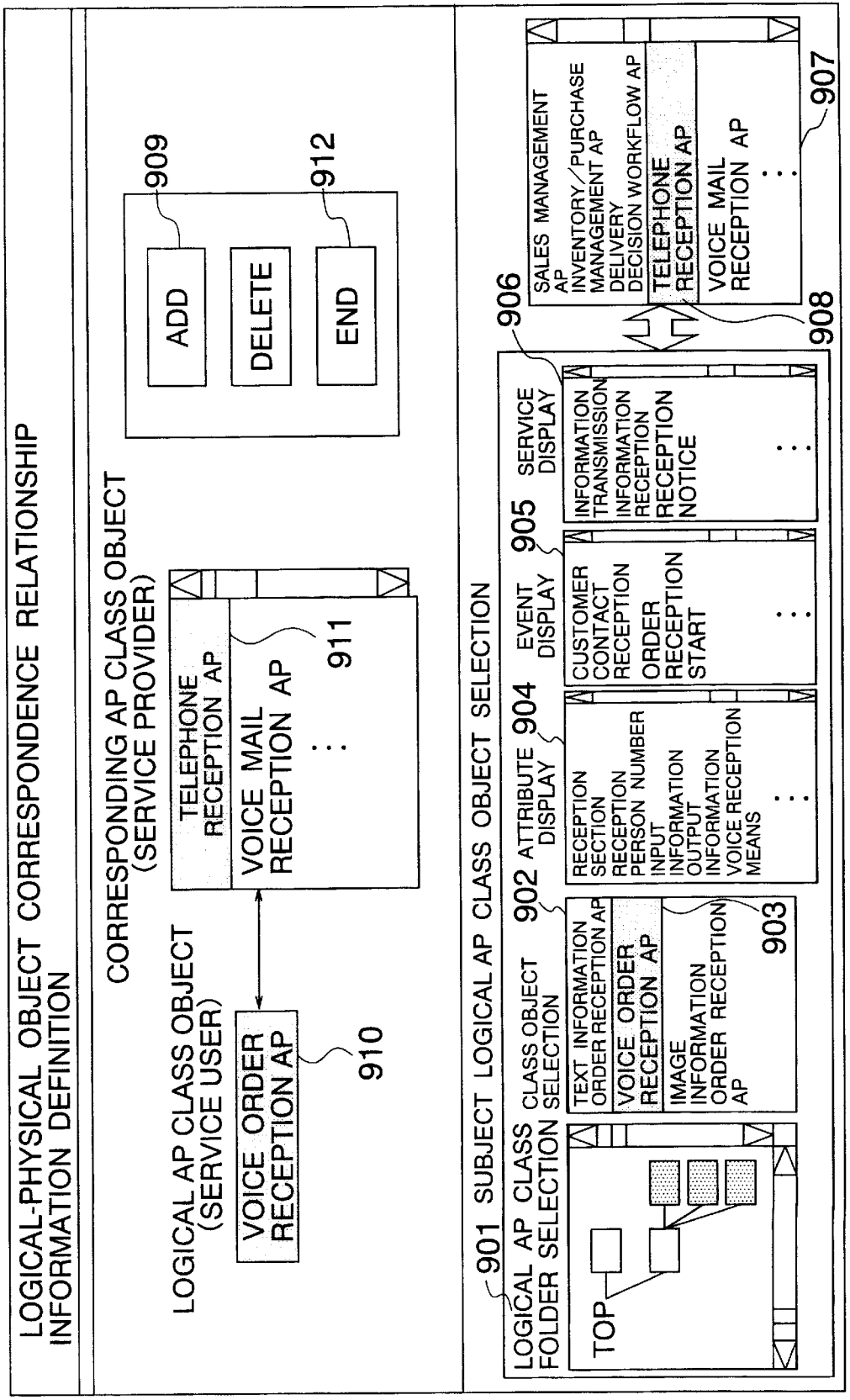
FIG. 9 is a diagram showing a definition screen of logical-physical object correspondence relationship information to be displayed during the operation illustrated in the flow chart of FIG. 8.

If selected, the program execution management program 113 activates the logical AP object repository definition program 108. In response to this, the logical AP object repository definition program 108 displays a definition screen of logical-physical object correspondence relationship information such as shown in FIG. 9 on the display device 115 (Step 802).

A logical AP object and a physical AP object are selected in accordance with user instructions received in a subject logical AP object selection screen displayed in the left area of the lower area (lower frame) of the definition screen and in a corresponding AP object selection screen (Step 803).

In a logical AP class folder selection frame 901 of the subject logical AP object selection screen, a tree-shaped node class folder diagram is displayed being simplified from the node class object information 102 of the logical AP object repository 106. In a class object selection frame 902, a list of names of folders (logical AP object) designated by the user with the keyboard 116 or mouse 117 is displayed. A user can select with the keyboard 116 or mouse 117 one logical AP object from the node class folder diagram displayed in the logical AP class folder selection frame 902 or from the list displayed in the class object selection frame 902 (In the example shown in FIG. 9, a voice order reception AP is selected).

The logical AP object repository definition program 108 retrieves the information on attributes, events, and services of the selected logical AP object from the node class object information 102 of the logical AP object repository 106, and displays the retrieved information in frames 904, 905, and 906 of the subject logical AP object selection screen. Thereafter, by using physical AP object information retrieval service provided by the distributed object platform program 112, physical AP objects defined by the information on the attributes, events, and services displayed in the frames 904, 905, and 906 are retrieved and displayed as a list 907. The user can select with the keyboard 116 or mouse 117 one physical AP object from the list 907 displayed in the corresponding AP object selection screen frame 901 (in the example shown in FIG. 9, a telephone reception AP 908 is selected).

Next, when an addition button 909 is depressed while the logical AP object and physical AP object are selected from the subject logical AP object selection screen and corresponding physical AP object selection screen, the logical AP object repository definition program 108 makes the selected logical AP object have a correspondence with the selected physical AP object. This correspondence relationship is reflected upon in correspondence relationship setting frames 910 and 911 in the upper area (upper frame) of the definition screen.

An operation of selecting one physical AP object from the list 907 displayed in the corresponding physical AP object selection screen may be repeated to make one logical AP object have a correspondence with a plurality of physical AP objects, as shown in FIG. 9.

The above operations (Step 803) are repeated for each logical AP object to be registered having a correspondence with a physical AP object (Step 804).

Next, when a depression of an end button 912 is detected, the logical AP object repository definition program 108 registers the defined correspondence relationship between logical AP objects and physical AP objects in the logical AP object repository 106 as the logical-physical correspondence relationship information 105 (Step 805).

Next, an operation of supporting configuration/reconfiguration of the business process support system will be described. Household electric commodities (telesales) are used by way of example for the description of the operation of supporting configuration/reconfiguration of the business process support system.

Figure 10:
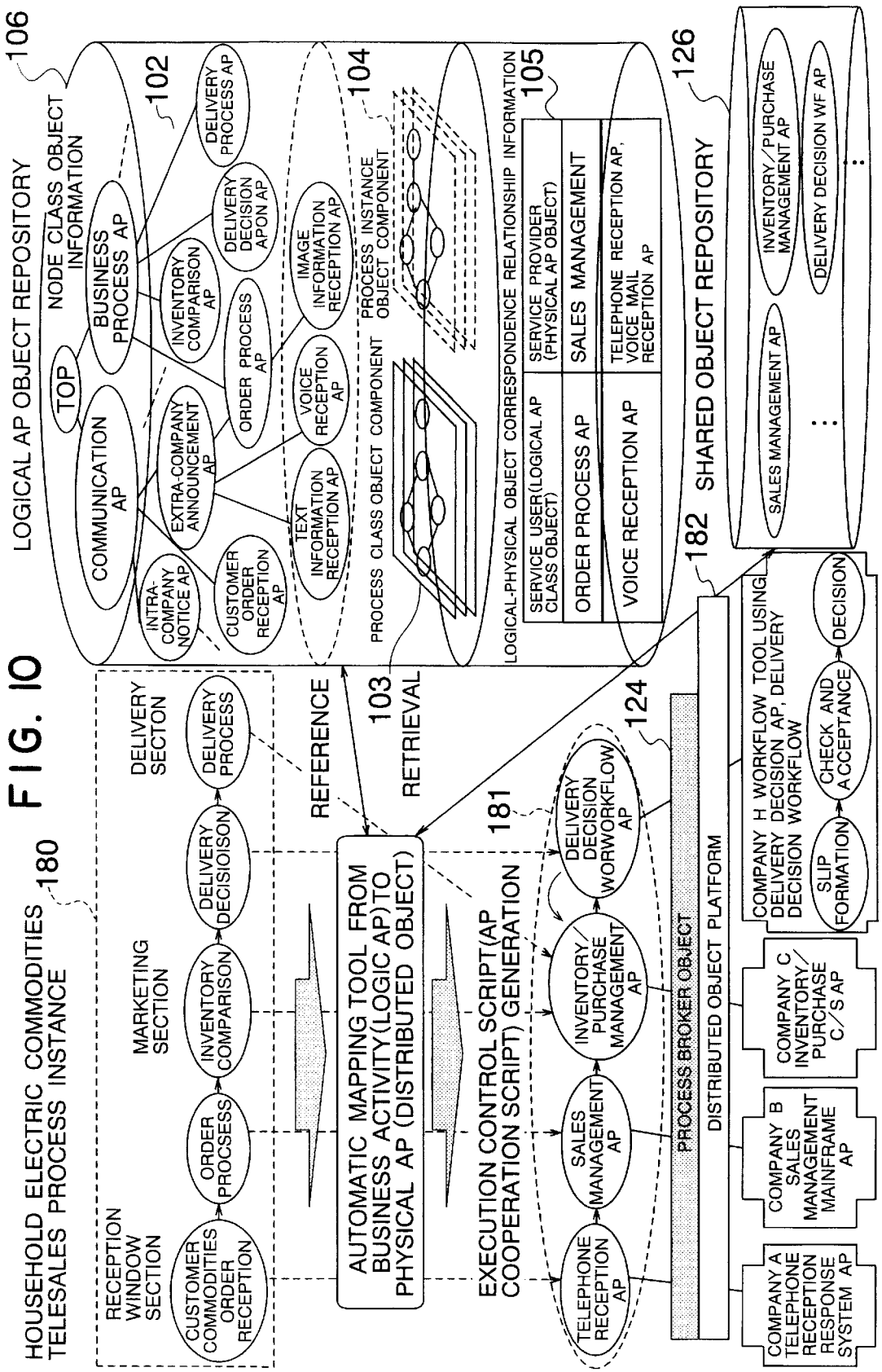
FIG. 10 is a conceptual diagram illustrating an operation of the application cooperation apparatus shown in FIG. 1 when configuration/reconfiguration of a business process support system for household electric commodities (direct sales) is supported.

FIG. 10 is a conceptual diagram illustrating an operation of supporting configuration/reconfiguration of the business process support system for household electric commodities (telesales) to be executed by the application cooperation apparatus of the first embodiment. The brief description of the process flow will be given with reference to FIG. 10 as in the following.

(1) The logical process model definition program 109 supplies a user via the display device 115 with the node class object information 102, process class object component library 103, or process instance object component library 104 respectively registered in the logical AP object repository 106 to make the user interactively define a process instance object (a logical process model constituted of logical AP objects) 180 specific to the household commodities (telesales) business to be configured.

(2) with reference to the logical-physical object correspondence relationship information 105 registered in the logical AP object repository 106, the logical→physical object conversion process program 110 selects a physical AP object corresponding to each of logical AP objects constituting the business process instance objects 180 defined by the logical process model definition program 109, and makes the selected physical AP objects cooperate each other to automatically map an implementation process model (a physical process model constituted of physical AP objects which are physical execution means).

(3) On the distributed object platform (realized by the distributed object platform program 112) 182 which provides a communication mechanism between physical AP objects, the execution control script generation process program 111 generates execution control scripts 181 for the process broker object 124 which controls the execution of the physical AP, and sets the scripts to the process broker object 124.

The details of the above operations (1) to (3) will be given sequentially.

First, an operation of defining the process instance object in the above operation (1) will be described.

Figure 11:
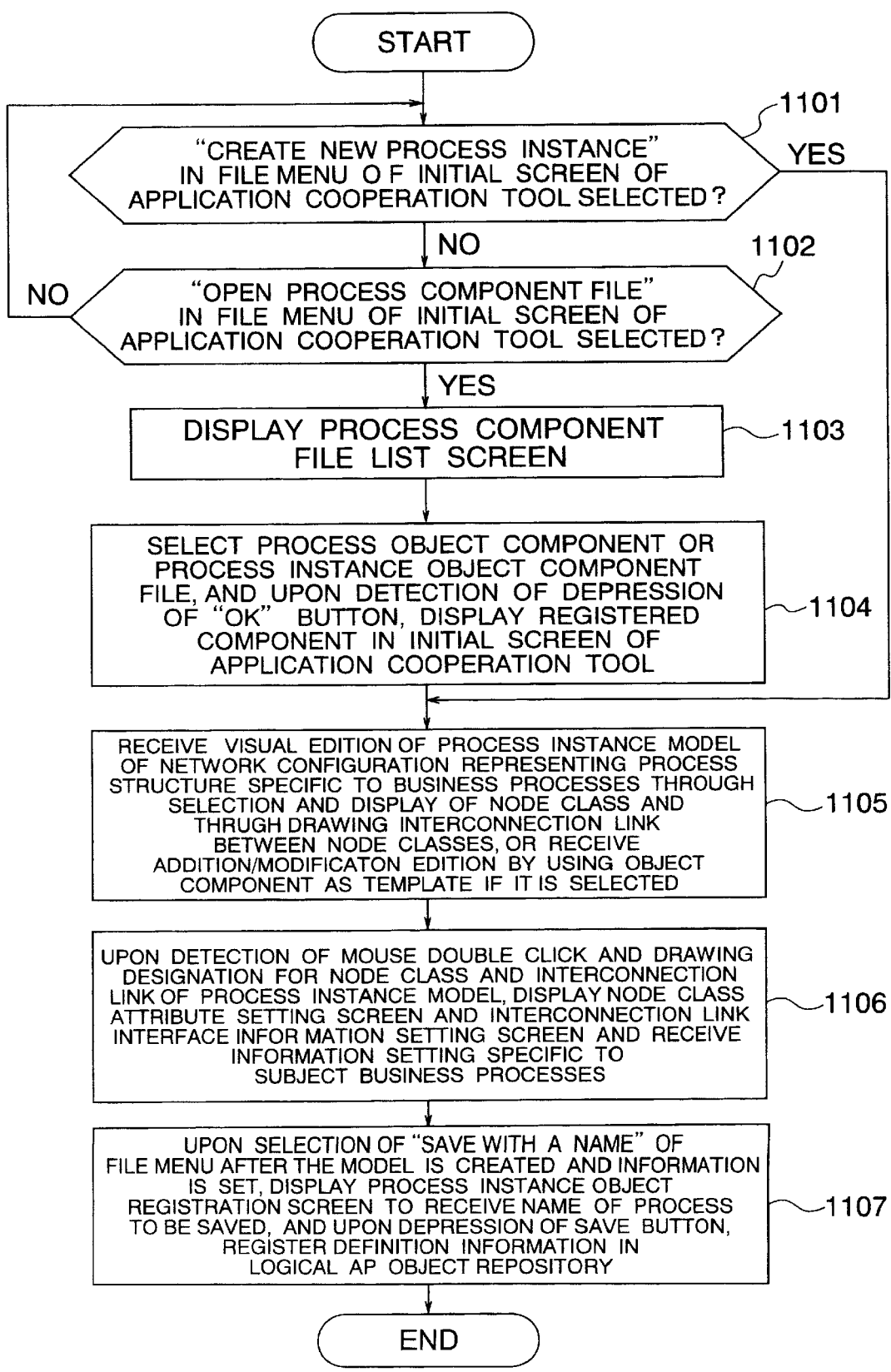
FIG. 11 is a flow chart illustrating an operation of the application cooperation apparatus shown in FIG. 1 when a process instance object is defined.

FIG. 11 is a flow chart illustrating the operation of defining the process instance object. The operation of this flow chart starts after the cooperation definition client 101 executes the program execution management program 113 and the initial screen of an application cooperation tool such as shown in FIG. 3 is displayed on the display device 115.

First, the program execution management program 113 checks whether or not a user selects with the mouse 117 or keyboard 116 an item "form new process instance 307" in the file menu of the initial screen shown in FIG. 3 (Step 1101). If selected, the logical process model definition program 109 is activated to display the definition screen of a process instance object on the display device 115 to follow Step 1105.

If not selected, it is checked whether or not the user selects with the mouse 117 or keyboard 116 an item "open process component file 304" in the file menu of the initial screen shown in FIG. 3 (Step 1102). If not, the flow returns to Step 1101, whereas if selected, the list of process class object components registered in the process class object component library 103 of the logical AP object repository 106 and the list of process instance object components registered in the process instance object component library 104 of the logical AP object repository 106 are displayed (Step 1103).

Information on the process components designated by the user with the keyboard 116 or mouse 117 is read from the logical AP object repository 106.

Next, the logical process model definition program 109 is activated to display the definition screen of a process instance object on the display device 115, and the read process components are displayed on the definition screen (Step 1104).

Figure 12:
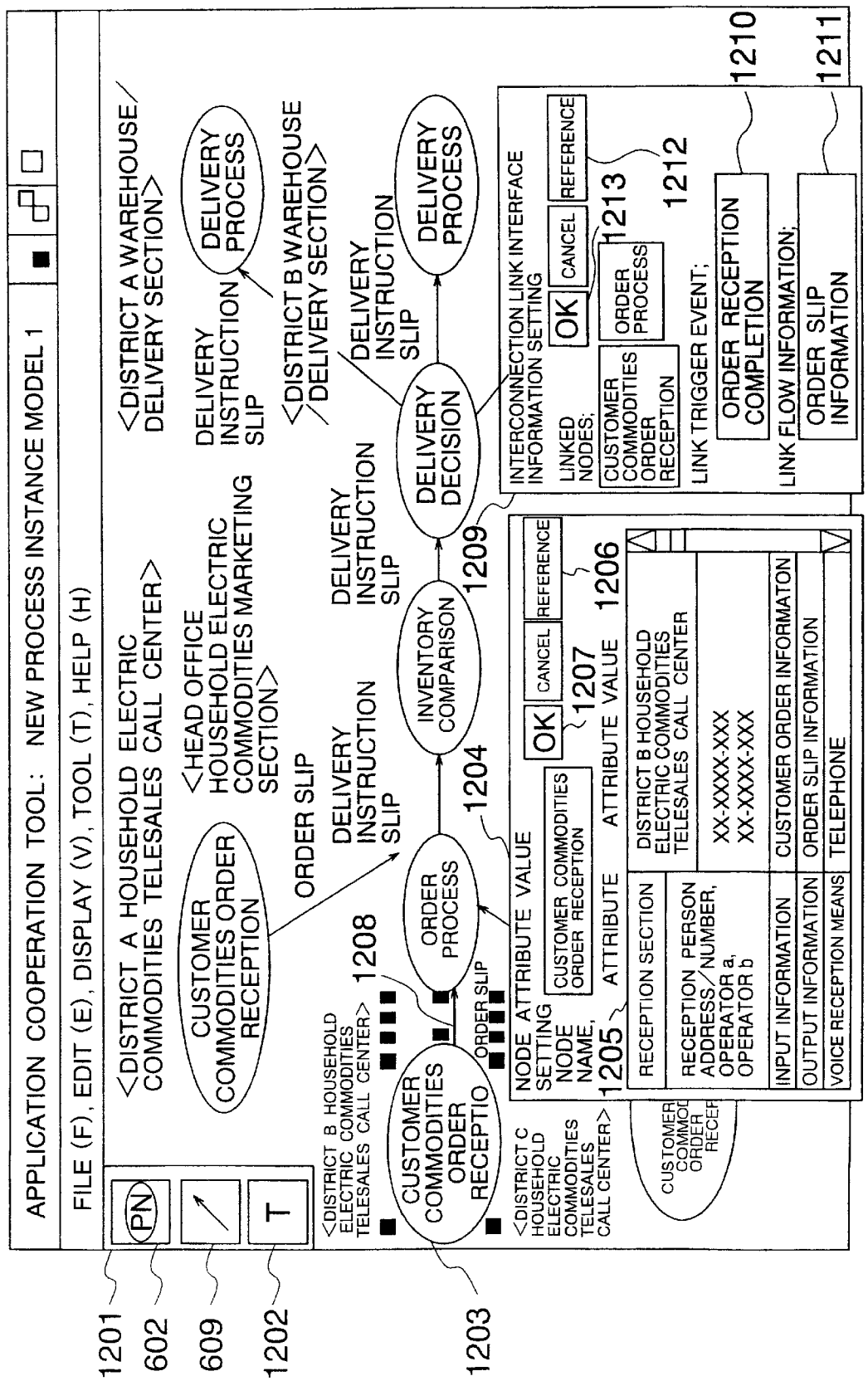
FIG. 12 is a diagram showing a definition screen of a process instance object to be displayed during the operation illustrated in the flow chart of FIG. 11.

FIG. 12 shows an example of the definition screen of a process instance object, the screen displaying designated process components.

At Step 1105 the logical process model definition program 109 displays logical AP objects and draws interconnections between the displayed logical AP objects as shown in FIG. 12, by using a node icon 602 and a link icon 609 in a tool box 1201 displayed in the definition screen of a process instance object and in a manner similar to the definition (refer to FIGS. 5 and 6) of the process class object component. In this manner, a process instance model of a network configuration representing a process structure specific to the business processes can be defined interactively with the user.

At Step 1106 the logical process model definition program 109 displays an attribute value setting screen of a node (logical AP object) designated by the user with the mouse 117 and an interface information setting screen of an interconnection link, and receives set attribute values and interface information specific to the business processes.

In the example shown in FIG. 12, a node "customer commodities order reception 1203" and an interconnection link "order slip 1208" are selected and a corresponding node attribute value setting screen 1204 and a corresponding interconnection link interface information setting screen 1209 are displayed. Marks around the node 1203 and link 1208 indicate that these node and link are selected.

The name of the selected node is displayed in the node attribute value setting screen 1204. If a reference button 1206 is depressed, candidates of the node attribute values are displayed in an attribute setting frame 1205. In retrieving the candidates of the attribute value, the information retrieval service provided by the distributed object platform program 112 is used to access the distributed object repository 125 of the distributed object server 120 and acquire attributes and their values defined for the physical AP object.

Depressing a text input button 1202 of the tool box 1201, the user can enter an attribute value in the attribute value setting frame or edit the attribute value displayed in the attribute value setting frame 1205 with the keyboard 116.

Upon depression of an OK button in the node attribute value setting screen 1204, the logical process model definition program 109 sets the selected node attribute value in accordance with the displayed contents of the node attribute value setting screen 1204.

In the example shown in FIG. 12, attribute values "district B household electric commodities telesales call center", "reception person telephone number (XXX-XXXX-XXXX, XX-XXXX-XXXY, . . . ", "customer order information", "order slip information", and "telephone" are set respectively for the attributes "reception section", "reception person address/number (operator a, operator b, . . . )", "input information", "output information", and "voice reception means" of the customer commodities order reception node 1203.

The name of a node to be connected to the selected link is displayed on the interconnection link interface information setting screen 1209. A link trigger event and link flow information entered by the user with the keyboard 116 are displayed in a link trigger event frame 1210 and a link flow information frame 1211. The link trigger event is an event which transfers the business process from one node to another node connected by the link. The link flow information is information to be exchanged between linked nodes when the trigger event is issued, and is contained in the attribute and its value of the link originating node or in the event information.

Upon depression of the reference button 1206 of the interconnection link interface information setting screen 1209, the logical process model definition program 109 displays a list of attributes, their values, and event information of the link originating node (in the example shown in FIG. 12, the customer commodities order reception). This list information supports the user to set necessary information in the link trigger event frame 1210 and link flow information frame 1211. Upon depression of the OK button 1213 of the interconnection link interface information setting screen 1209, the logical process model definition program 109 sets the link trigger event and link flow information of the selected link in accordance with the display contents of the interconnection link interface information setting screen 1209.

In the example shown in FIG. 12, a link trigger event 1210 "order reception completion" and link flow information 1211 "order slip information" are set for the order slip link 1208.

With the Steps 1101 to 1106, a desired process instance object is defined.

In the example of the household electric commodities telesales process instance object shown in FIG. 12, the order to delivery business processes shown in FIG. 7 and registered in the process class object component library 103 are used as a template of the process class object components. In order to realize the call center configuration for districts A, B, and C, customer commodities order reception nodes are added, and in order to realize the warehouse/delivery section configuration for districts A, B, and C, delivery process nodes are added. In the above manner, the process structure specific to the subject household electric commodities sales (telesales) business is edited.

After the process instance object is defined by the above Steps and when a file menu item "save with a name 305" is selected, the logical process model definition program 109 displays a process instance object registration screen similar to the registration screen shown in FIG. 7 and receives the name of the process to be saved.

Information on the defined process instance object components are registered in the process instance object component library 104 of the logical AP object repository 106 (Step 1107).

Next, the automatic mapping of the implementation process model and the generation of execution control scripts in the operations (2) and (3) will be described.

Figure 13:
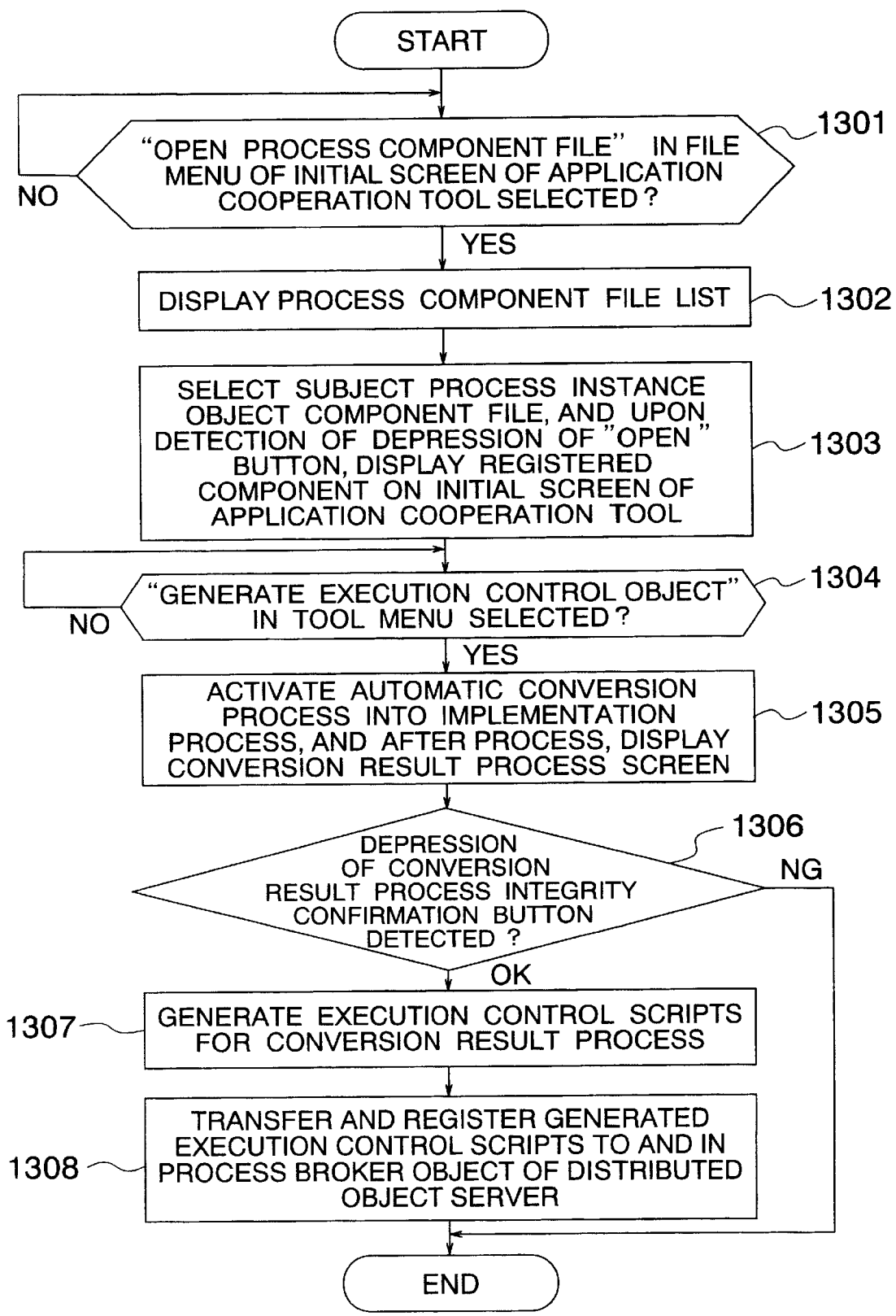
FIG. 13 is a flow chart illustrating an operation of the application cooperation apparatus shown in FIG. 1 when an implementation process model is automatically mapped and execution control scripts are generated.

FIG. 13 is a flow chart illustrating the operations of the automatic mapping of the implementation process model and the generation of execution control scripts. The operation of this flow chart starts after the cooperation definition client 101 executes the program execution management program 113 and the initial screen of an application cooperation tool such as shown in FIG. 3 is displayed on the display device 115.

First, the program execution management program 113 checks whether or not a user selects with the mouse 117 or keyboard 116 an item "open process component file 304" in the file menu of the initial screen shown in FIG. 3 (Step 1301). If selected, a list of process instance object components registered in the process instance object component library 104 of the logical AP object repository 106 is displayed (Step 1302). The process instance object component selected by the user with the mouse 117 or keyboard 116 is displayed on the screen (Step 1303).

Next, the program execution management program 113 checks whether or not a user selects with the mouse 117 or keyboard 116 an item "generate execution control object 306", in the file menu of the initial screen shown in FIG. 3 (Step 1304). If selected, the logical-physical object conversion process program is activated to automatically convert the process instance object component displayed on the screen into an implementation process and display the conversion result in the screen (Step 1305).

In the logical-physical process automatic conversion process, the physical AP object corresponding to each node (logical AP object) constituting the process instance object component is identified by referring to the logical-physical object correspondence relationship information 105 in the logical AP object repository 106, and identified physical AP objects are interconnected in accordance with the interconnection link information of respective nodes constituting the process instance object components. In this manner, the implementation process can be derived.

In this case, if one logical AP object constituting the process instance object component is made to have a correspondence with a plurality of physical AP objects, it is preferable to select a physical AP object satisfying the attribute value of the logical AP object and containing most service items of the logical AP object.

For example, if the logical-physical object correspondence relationship information 105 defines two physical AP objects "telephone reception AP" and "voice main reception AP" as the physical objects corresponding to the logical AP object "customer commodities order reception 1203" of the district B household electric commodities call center shown in FIG. 12, then the attribute values of the logical AP object "customer commodities order reception 1203" are:

reception section =district B household electric commodities telesales call center;

reception person address/number (operator a, operator b . . . )=XXX-XXX-XXXX, XX-XXXX-XXXY, . . . ;

input information=customer order information;

output information=order slip information; and voice reception means=telephone.

In this case, if the attribute values of the physical AP object "telephone reception AP" are:

reception section=districts A, B, C household electric commodities telesales call centers;

reception person address/number (operator a, operator b . . . . )=XXX-XXX-XXXX, XX-XXXX-XXXY, . . . ;

input information=customer order information;

output information=order slip information; and voice reception means=telephone, and if the attribute values of the physical AP object "voice mail reception AP" are:

reception section=districts A, B household electric commodities telesales call centers;

reception person address/number (operator a, operator b . . . )=XXX-XXX-XXXX, XX-XXXX-XXXY, . . . ;

input information=customer order information;

output information=order slip information; and voice reception means=mail, then although the telephone reception AP satisfies the conditions "voice reception means=telephone" of the attribute value of the logical AP, it does not satisfy the voice mail reception AP. In this case, the telephone reception AP is selected as an alternative physical AP object.

If there is no corresponding physical AP object, an alternative physical AP object is selected from the physical AP objects corresponding to a logical AP object one level higher than the subject logical AP object and corresponding to other logical AP objects one level lower than the one level higher logical AP object, by referring to the inheritance relationship 410 in the node class object information 102 of the logical AP object repository 106, the selected alternative physical AP object satisfying most the conditions of attribute values, events, and services of the subject logical AP object.

Figure 14:
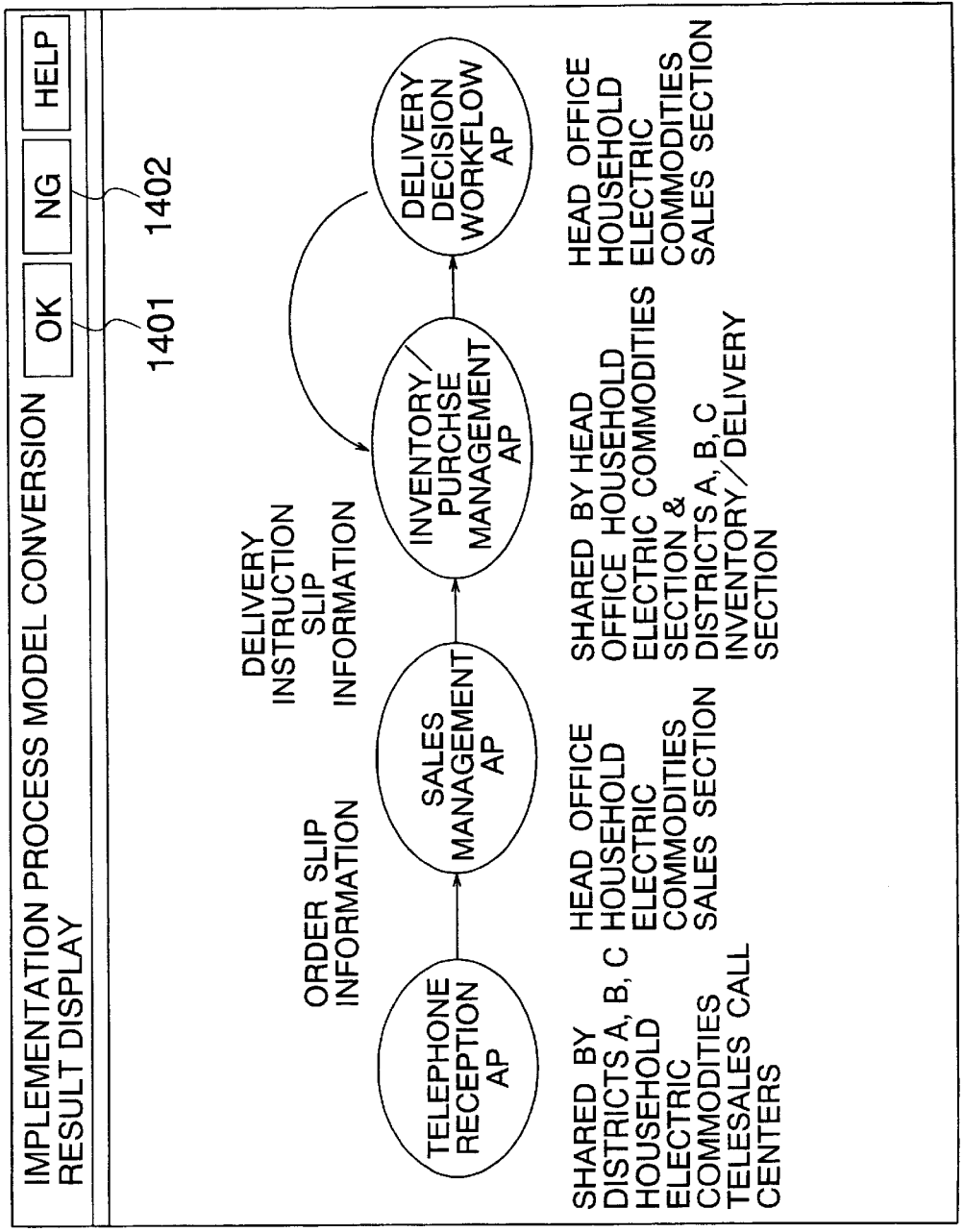
FIG. 14 is a diagram showing a conversion result display screen of an implementation process model to be displayed during the operation illustrated in the flow chart of FIG. 13.

FIG. 14 shows an example of a display screen of conversion results from the process instance object component to the implementation process.

In this example shown in FIG. 14, the logical AP objects constituting the process instance object components "customer commodities order reception", "inventory comparison", "delivery decision", and "delivery process" are converted respectively into the physical AP objects "telephone reception AP", "sales management AP", "inventory/purchase management AP", "delivery decision workflow AP", and "inventory/purchase management AP". The telephone reception AP is shared by the districts A, B, and C household electric commodities telesales centers. The inventory/purchase management AP is shared by the head office household electric commodities sales section and the districts A, B, C warehouse/delivery sections.

Next, the logical→physical object conversion process program 110 checks whether an OK button 1401 or an NG button 1402 on the screen is depressed (Step 1306). If the NG button 1402 is depressed, the execution control object generation process is cancelled and this flow is terminated.

If the OK button 1401 is depressed, the execution control script generation process program 111 is activated to generate execution control scripts (e.g., Interface Definition Language (IDL) under standardization by the Object Management Group (OMG)) in a definition language for a conversion result physical process model (implementation process model) (Step 1307). Thereafter, the generated execution control scripts are transferred to and registered in the process broker object 124 which controls the execution of each physical AP object on the distributed object platform 182 (realized by the distributed object platform program 112) providing the communication mechanism between physical AP objects (Step 1308).

In accordance with the process model represented by the generated execution control scripts, the process broker object 124 sequentially executes the physical AP objects stored in the shared object repository 126. In the above manner, a household electric commodities (telesales) business process support system can be configured.

In the application cooperation apparatus of the first embodiment described above, a concept of logical AP object is introduced which shows a process unit as viewed from an actual business viewpoint, and means for automatically converting a logical process model (process instance object component) constituted of logical AP objects into a physical process model (implementation process model) constituted of physical AP objects which are physical execution means for information processing and means for automatically generating execution control scripts in the definition language for the conversion result physical process model are provided. Accordingly, a user or system configuring person can configure/reconfigure a desired business process support system only by defining a process model from the actual business viewpoint.

It is therefore possible to make system implementation easily and quickly without knowledge and experiences of various information technologies and applications. A business process support system more suitable for a business can therefore be configured/reconfigured.

Also in the embodiment, means for defining a new logical process model by positively utilizing logical process models (process instance object components) defined in the past and registered in the logical AP object repository and means for supporting to define the logical process model by using an interactive screen displayed on a display device are provided. Accordingly, a business process support system flexibly applicable to each business can be realized easily just like assembling components.

Also in this embodiment, in automatically converting a logical process model into a physical process model, if there is no physical AP object corresponding to a logical AP object, a physical AP object corresponding to a logical AP object near the subject logical AP object as located in accordance with the inheritance relationship in the node class object information, is used as an alternative physical AP object. A business process support system can be configured flexibly even under the restrictions of available information resources.

Further, execution control scripts obtained by using the above means are supplied to the process object broker on the distributed object platform. Therefore, application resources developed independently can be effectively utilized, and by cooperating these applications, an enterprise application system for supporting the whole processes over sections, offices, or enterprises can be easily configured/reconfigured.

The first embodiment has been described above.

Next, the second embodiment of the invention will be described.

The application cooperation apparatus of the second embodiment is a modification of the first embodiment. In the second embodiment, the application cooperation apparatus automatically converts a logical AP object into a physical AP object without using the logical-physical object correspondence relationship information 105.

The structure and operation of the second embodiment is basically similar to the first embodiment, excepting that in FIG. 1 the logical-physical object correspondence relationship information 105 is not used and the logical AP object repository definition program 108 does not support to define the logical-physical object correspondence relationship information.

Also at Step 1305 shown in FIG. 13, in automatically converting the process instance object component into the implementation process, the logical→physical process conversion process program 110 identifies the physical AP object corresponding to the logical AP object by referring to the logical-physical object correspondence relationship information 105. In the second embodiment, instead, by using an interface provided by the distributed object platform program 112, a physical AP object having service information of a logical AP object is retrieved from the distributed object repository 125 of the distributed object server 120.

Selection of a physical AP object from a plurality of retrieved corresponding physical AP objects and identification of an alternative physical AP object when there is no corresponding physical Ap object, are performed in the manner similar to the first embodiment.

According to the second embodiment of the invention, it is not necessary to prepare the logical-physical object correspondence relationship information so that preliminary definition of correspondence relationship information and management load are not necessary. Since the corresponding physical AP object is directly retrieved from the distributed object repository of the distributed object server 120, latest available information resources can be utilized when a implementation process model is generated.

The second embodiment of the invention has been described above.

Next, the third embodiment of the invention will be described.

The application cooperation apparatus of the third embodiment is a modification of the first embodiment. In the third embodiment, a plurality of users can share the logical AP object repository which stores component/work information used for the system configuration.

Figure 15:
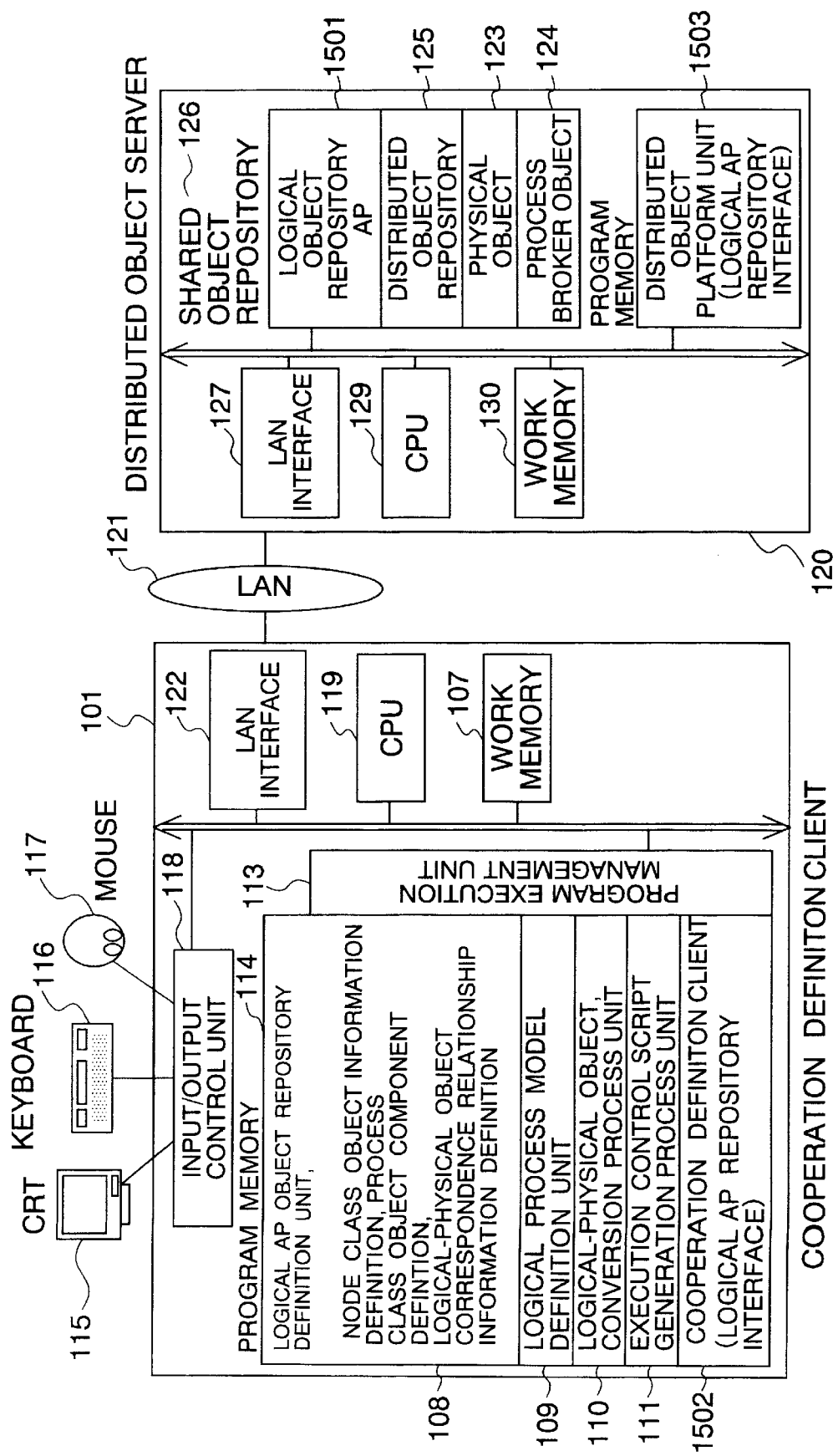
FIG. 15 is a schematic diagram showing the structure of an application cooperation apparatus according to a third embodiment of the invention.

FIG. 15 is a schematic diagram showing the structure of an application cooperation apparatus according to the third embodiment of the invention.

The operation of the application cooperation apparatus of this embodiment is basically similar to the first embodiment. However, the structure is different from the first embodiment as shown in FIG. 15 in that a logical AP object repository 1501 is provided in the shared object repository 126 of the distributed object server 120 and that an information registration/retrieval interface to the logical AP object repository 1501 is added to distributed object platform programs 1502 and 1503.

In this embodiment, each user or cooperation definition client 101 accesses via LAN 121 to the distributed object server 120, and registers/retrieves information in/from the logical AP object repository 1501 by using the information registration/retrieval interface to the logical AP object repository 1501.

It is therefore possible to reduce a definition load of each piece of information required for configuration/reconfiguration of the business process support system. Knowledge used in the past for configuration/reconfiguration of business process support systems can be utilized more efficiently and effectively.

The third embodiment of the invention has been described above.

Next, the fourth embodiment of the invention will be described.

The application cooperation apparatus of the fourth embodiment is a modification of the first embodiment. In the fourth embodiment, a logical AP object repository and system configuration programs (a logical AP object repository definition program, a logical process model definition program, and the like) which are information of components/past work examples used for system configuration, are made usable in a portable way.

Figure 16:
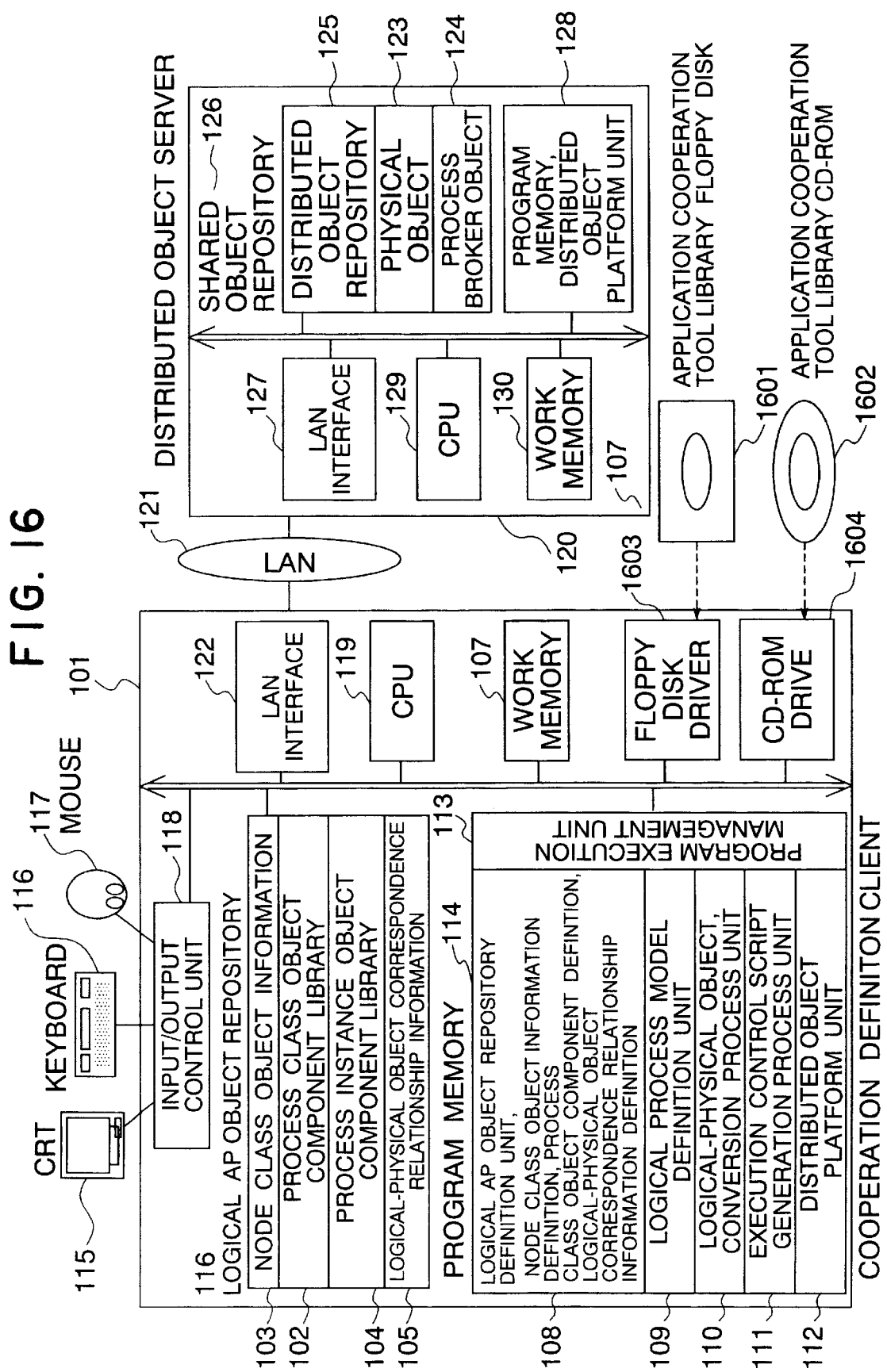
FIG. 16 is a schematic diagram showing the structure of an application cooperation apparatus according to a fourth embodiment of the invention.

FIG. 16 is a schematic diagram showing the structure of an application cooperation apparatus according to the fourth embodiment of the invention.

The operation of the application cooperation apparatus of this embodiment is basically similar to the first embodiment. However, the structure is different from the first embodiment as shown in FIG. 16 in that the information to be stored in the logical AP object repository 106 and programs to be stored in the program memory 114 are stored in storage media such as a floppy disk 1601 and a CD-ROM 1602.

In this embodiment, the information and programs stored in the recording media, floppy disk 1601 and CD-ROM 1602, are downloaded to an information processing apparatus (personal computer, workstation or the like) having a floppy disk drive 1603 and a CD-ROM derive 1604. Therefore, the application cooperation apparatus can be realized on an information processing apparatus installed at a desired site.

As described so far, according to the present invention, it is possible to configure/reconfigure a business process support system, without making a user or developer think of system realizing means such as various types of information technologies/application tools.

What is claimed is:

1. An application cooperation method for supporting configuration/reconfiguration of a business process support system, comprising:

a logical process model definition step of providing logical application object (hereinafter called a logical AP object) information including node class object information and defining interactively with a user a logical process model having logical AP objects as business components, the logical AP object information defining the logical AP object for abstractly defining contents of information processing as an object class for each common process item and attribute and defining an inheritance relationship between object classes as a tree structure;

an implementation process model generation step of selecting a physical application object (hereinafter called a physical AP object) corresponding to each logical AP object constituting the logical process model defined by said logical process model definition step, by referring to logical-physical object correspondence information representative of a correspondence relationship between the logical AP object and the physical AP object for defining a business application (hereinafter called a business AP) which is physical execution means for performing information processing in the unit of an object formed through distributed object technologies, and generating an implementation process model of the logical process model through cooperation of selected physical AP objects;

a script generation step of generating execution control scripts in a definition language for the implementation process model generated by said implementation process model generation step; and a process model supply step of supplying a process model of the execution control scripts generated by said script generation step to a process broker object provided as a common business object on a distributed object platform ensuring a mutual cooperation between physical AP objects.

2. An application cooperation method according to claim 1, further comprising a logical-physical object correspondence information definition step of defining interactively with the user the logical-physical object correspondence information prior to said logical process model definition step.

3. An application cooperation method for supporting configuration/reconfiguration of a business process support system, comprising:

a logical process model definition step of providing logical application object (hereinafter called a logical AP object) information including node class object information and defining interactively with a user a logical process model having logical AP objects as business components, the logical AP object information defining the logical AP object for abstractly defining contents of information processing as an object class for each common process item and attribute and defining an inheritance relationship between object classes as a tree structure;

an implementation process model generation step of retrieving a physical application object (hereinafter called a physical AP object) for defining a business application (hereinafter called a business AP) which is physical execution means for performing information processing in the unit of an object formed through distributed object technologies, the physical AP object corresponding to each logical AP object constituting the logical process model defined by said logical process model definition step, by using an interface provided by a distributed object platform ensuring a mutual cooperation between physical AP objects, and generating an implementation process model of the logical process model through cooperation of retrieved physical AP objects;

a script generation step of generating execution control scripts in a definition language for the implementation process model generated by said implementation process model generation step; and a process model supply step of supplying a process model of the execution control scripts generated by said script generation step to a process broker object provided as a common business object on the distributed object platform.

4. An application cooperation method according to claim 3, wherein said implementation process model generation step retrieves the physical AP object corresponding to the logical AP object in accordance with attribute information or service information of the logical and physical objects.

5. An application cooperation method according to claim 1, wherein if the physical AP object corresponding to the logical AP object constituting the logical process model defined by said logical process model definition step cannot be selected, said implementation process model generation step selects as an alternative physical AP object a physical AP object corresponding to a logical AP object defined at a superior object class relative to the subject physical AP object in the inheritance relationship in the node class object information or corresponding to a logical AP object defined at a subordinate object class relative to the superior object class.

6. An application cooperation method according to claim 1, wherein the logical AP object information includes, in addition to the node class object information, a plurality of process class object components constituted of a plurality of logical AP objects, as a template component of a logical process.

7. An application cooperation method according to claim 1, wherein the logical AP object information includes, in addition to the node class object information, a plurality of process instance object components formed in advance as a configuration work component of a logical process, the process instance object components constituting the logical process model.

8. An application cooperation method according to claim 1, further comprising a logical AP object information definition step of defining the logical AP object information interactively with the user prior to said logical process model definition step.

9. A storage medium storing a program for making an information processing apparatus execute the application cooperation method according to claim 1.

10. An application cooperation apparatus for supporting configuration/reconfiguration of a business process support system, comprising:

logical application object (hereinafter called a logical AP object) information storing means for storing logical AP object information including node class object information, the logical AP object information defining the logical AP object for defining contents of information processing as an object class for each common process item and attribute and defining an inheritance relationship between object classes as a tree structure;

logical-physical object correspondence information storing means for storing logical-physical object correspondence information representative of a correspondence relationship between the logical AP object and a physical application object (hereinafter called a physical AP object) for defining a business application (hereinafter called a business AP) which is physical execution means for performing information processing in the unit of an object formed through distributed object technologies;

logical process model defining means for providing the logical AP object information stored in said logical AP object information storing means and defining interactively with a user a logical process model having logical AP objects as business components;

implementation process model generating means for selecting the physical AP object corresponding to each logical AP object constituting the logical process model defined by said logical process model definition means, by referring to the logical-physical object correspondence information stored in said logical-physical object correspondence information storing means;

script generating means for generating execution control scripts in a definition language for the implementation process model generated by said implementation process model generating means; and process model providing means for providing a process broker object for controlling an execution of the physical AP object in accordance with a process model represented by the execution control scripts generated by said script generation means, the process broker object being provided as a common business object on a distributed object platform ensuring a mutual cooperation between physical AP objects.

11. An application cooperation apparatus for supporting configuration/reconfiguration of a business process support system, comprising:

logical AP object (hereinafter called a logical AP object) information storing means for storing logical AP object information including node class object information and defining interactively with a user a logical process model having logical AP objects as business components, the logical AP object information defining the logical AP object for abstractly defining contents of information processing as an object class for each common process item and attribute and defining an inheritance relationship between object classes as a tree structure;

logical process model defining means for providing the logical AP object information stored in said logical AP object information storing means and defining interactively with a user a logical process model having logical AP objects as business components;

implementation process model generating means for retrieving a physical application object (hereinafter called a physical AP object) for defining a business application (hereinafter called a business AP) which is physical execution means for performing information processing in the unit of an object formed through distributed object technologies, the physical AP object corresponding to each logical AP object constituting the logical process model defined by said logical process model defining means, by using an interface provided by a distributed object platform ensuring a mutual cooperation between physical AP objects, and generating an implementation process model of the logical process model through cooperation of retrieved physical AP objects;

script generating means for generating execution control scripts in a definition language for the implementation process model generated by said implementation process model generating means; and process model providing means for providing a process broker object for controlling an execution of the physical AP object in accordance with a process model represented by the execution scripts generated by said script generating means, the process broker object being provided as a common business object on a distributed object platform ensuring a mutual cooperation between physical AP objects.

12. An application cooperation apparatus according to claim 11, wherein the logical AP object information includes, in addition to the node class object information, a plurality of process class object components constituted of a plurality of logical AP objects, as a template component of a logical process.

13. An application cooperation apparatus according to claim 11, wherein the logical AP object information includes, in addition to the node class object information, a plurality of process instance object components formed in advance as a configuration work component of a logical process, the process instance object components constituting the logical process model.

14. A client server system comprising:

a cooperation definition client comprising the application cooperation apparatus according to claim 10; and a distributed object server for executing the physical AP object in accordance with the execution control scripts generated by said cooperation definition client.

15. A client server system according to claim 14, wherein said storing means is provided in said distributed object server instead of said cooperation definition client.

16. A computer program product used for application cooperation for supporting configuration/reconfiguration of a business process support system, comprising:

a logical process model definition process part of providing logical application object (hereinafter called a logical AP object) information including node class object information and defining interactively with a user a logical process model having logical AP objects as business components, the logical AP object information defining the logical AP object for abstractly defining contents of information processing as an object class for each common process item and attribute and defining an inheritance relationship between object classes as a tree structure;

an implementation process model generation process part of selecting a physical application object (hereinafter called a physical AP object) corresponding to each logical AP object constituting the logical process model defined by said logical process model definition process part, by referring to logical-physical object correspondence information representative of a correspondence relationship between the logical AP object and the physical AP object for defining a business application (hereinafter called a business AP) which is physical execution means for performing information processing in the unit of an object formed through distributed object technologies, and generating an implementation process model of the logical process model through cooperation of selected physical AP objects;

a script generation process part of generating execution control scripts in a definition language for the implementation process model generated by said implementation process model generation process part; and a process model supply process part of supplying a process model represented by the execution control scripts generated by said script generation process part to a process broker object provided as a common business object on a distributed object platform ensuring a mutual cooperation between physical AP objects.

* * * * *